US011093828B2

(12) United States Patent
Takigawa et al.

(10) Patent No.: US 11,093,828 B2
(45) Date of Patent: Aug. 17, 2021

(54) FIBER LASER DEVICE AND MACHINE LEARNING DEVICE

(71) Applicant: Fanuc Corporation, Yamanashi (JP)

(72) Inventors: Hiroshi Takigawa, Yamanashi (JP); Hisatada Machida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 310 days.

(21) Appl. No.: 16/240,239

(22) Filed: Jan. 4, 2019

(65) Prior Publication Data

US 2019/0213479 A1 Jul. 11, 2019

(30) Foreign Application Priority Data

Jan. 9, 2018 (JP) .............................. JP2018-001500

(51) Int. Cl.
*G06N 3/08* (2006.01)
*B23K 26/03* (2006.01)
(Continued)

(52) U.S. Cl.
CPC .............. *G06N 3/08* (2013.01); *B23K 26/03* (2013.01); *B23K 26/032* (2013.01);
(Continued)

(58) Field of Classification Search
CPC .... B23K 26/705; B23K 26/707; B23K 26/03; B23K 26/032; H01S 5/06
See application file for complete search history.

(56) References Cited

U.S. PATENT DOCUMENTS

| 2015/0048071 A1 | 2/2015 | Shioji |
| 2016/0246659 A1 | 8/2016 | Komatsu et al. |

(Continued)

FOREIGN PATENT DOCUMENTS

| CN | 106557070 A | 4/2017 |
| CN | 107181163 A | 9/2017 |

(Continued)

OTHER PUBLICATIONS

Campanelli, S. L. et al.; An artificial neural network approach for the control of the laser milling process; Int J Adv Manuf Technol (2013) 66:1777-1784. (Year: 2013).*

(Continued)

*Primary Examiner* — Stanley K. Hill
(74) *Attorney, Agent, or Firm* — RatnerPrestia

(57) ABSTRACT

A machine learning device is connected to a fiber laser device. The machine learning device observes, as a state variable representing a driving state of the fiber laser device, a state quantity including time-series data on output light detection results obtained by detecting a light output of laser light emitted from the fiber laser device and time-series data on reflected light detection results obtained by detecting reflected light of the laser light, and acquires determination data representing a failure occurrence situation in the fiber laser device as determined from a difference between the output light detection results and a light output instruction of the fiber laser device. The machine learning device learns a boundary condition for failure occurrence caused by the reflected light by using the state variable and the determination data.

17 Claims, 19 Drawing Sheets

(51) Int. Cl.
*B23K 26/70* (2014.01)
*G06N 5/00* (2006.01)
*G06N 99/00* (2019.01)
*G06N 10/00* (2019.01)
*G06N 7/00* (2006.01)
*G06N 20/00* (2019.01)
*G06N 20/10* (2019.01)
*G06N 3/00* (2006.01)
*G06N 20/20* (2019.01)

(52) U.S. Cl.
CPC .......... *B23K 26/705* (2015.10); *B23K 26/707* (2015.10); *G06N 3/00* (2013.01); *G06N 3/082* (2013.01); *G06N 3/084* (2013.01); *G06N 3/086* (2013.01); *G06N 3/088* (2013.01); *G06N 5/00* (2013.01); *G06N 7/00* (2013.01); *G06N 10/00* (2019.01); *G06N 20/00* (2019.01); *G06N 20/10* (2019.01); *G06N 20/20* (2019.01); *G06N 99/00* (2013.01)

(56) References Cited

U.S. PATENT DOCUMENTS

| | | |
|---|---|---|
| 2017/0090428 A1 | 3/2017 | Oohara |
| 2017/0220927 A1 | 8/2017 | Takigawa et al. |
| 2017/0262772 A1 | 9/2017 | Takigawa et al. |
| 2017/0270434 A1 | 9/2017 | Takigawa et al. |
| 2017/0344909 A1 | 11/2017 | Kurokawa et al. |
| 2017/0357243 A1 | 12/2017 | Takayama et al. |
| 2017/0358154 A1 | 12/2017 | Ishikawa et al. |

FOREIGN PATENT DOCUMENTS

| | | |
|---|---|---|
| JP | 63171290 A | 7/1988 |
| JP | 11104879 A | 4/1999 |
| JP | 2001009582 A | 1/2001 |
| JP | 2007-042981 A | 2/2007 |
| JP | 2013215801 A | 10/2013 |
| JP | 2016152011 A | 8/2016 |
| JP | 2017-131937 A | 8/2017 |
| JP | 2017164801 A | 9/2017 |
| JP | 2017211930 A | 11/2017 |
| JP | 2017218045 A | 12/2017 |
| JP | 2017220111 A | 12/2017 |

OTHER PUBLICATIONS

Hobbs, Douglas; Laser damage threshold measurements of anti-reflection microstructures operating in the near UV and mid-infrared; 2020 SPIE; Proc. of SPIE vol. 7842 78421Z-1; pp. 1-13. (Year: 2020).*
Japanese Decision to Grant a Patent for Japanese Application No. 2018-001500, dated Feb. 18, 2020, with translation, 5 pages.
Chinese Office Action for Chinese Application No. 2019100191603, dated Nov. 12, 2020 with translation, 12 pages.
Japanese Notice of Reasons for Refusal for Japanese Application No. 2018-001500, dated Nov. 19, 2019, with translation, 8 pages.

* cited by examiner

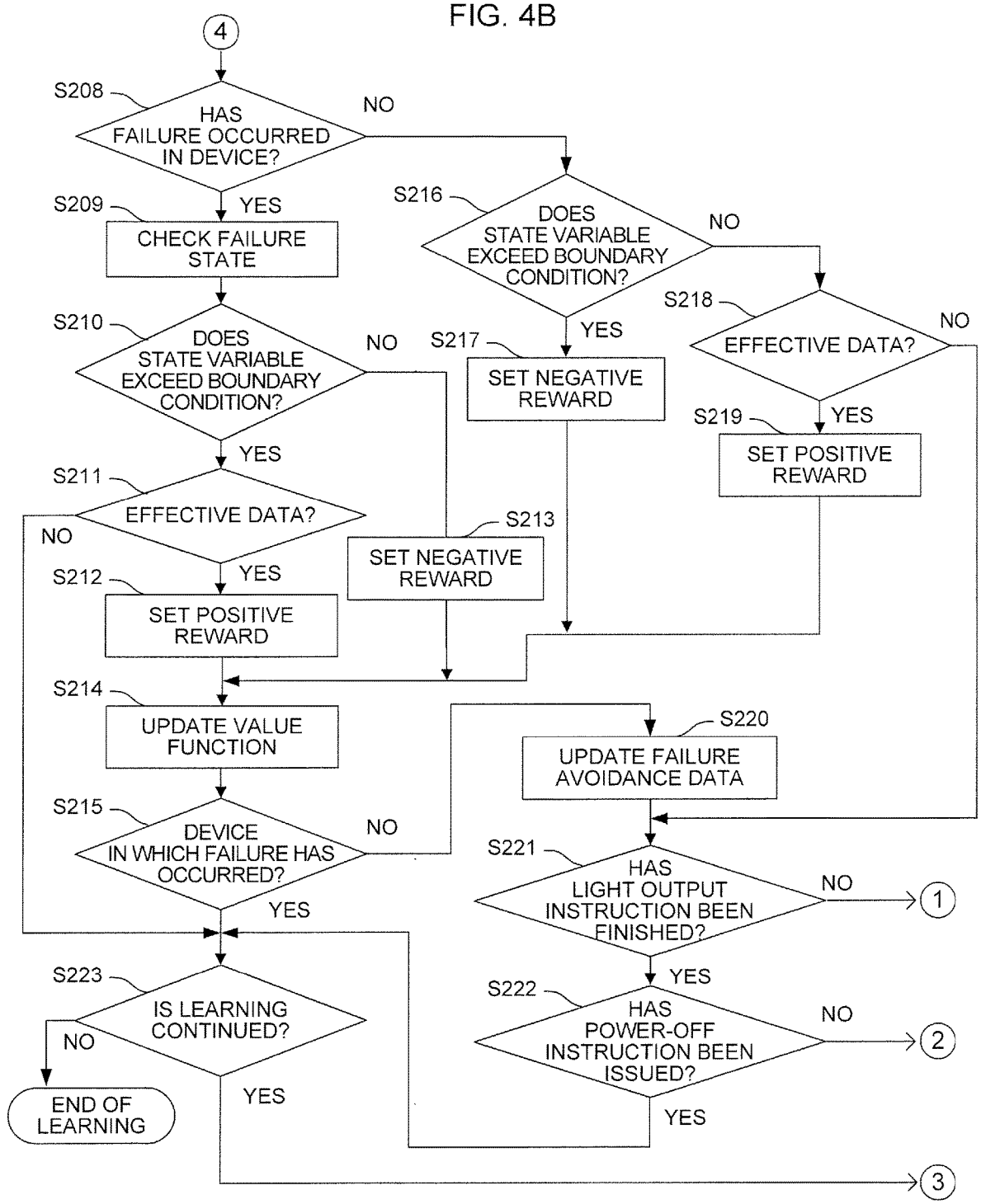

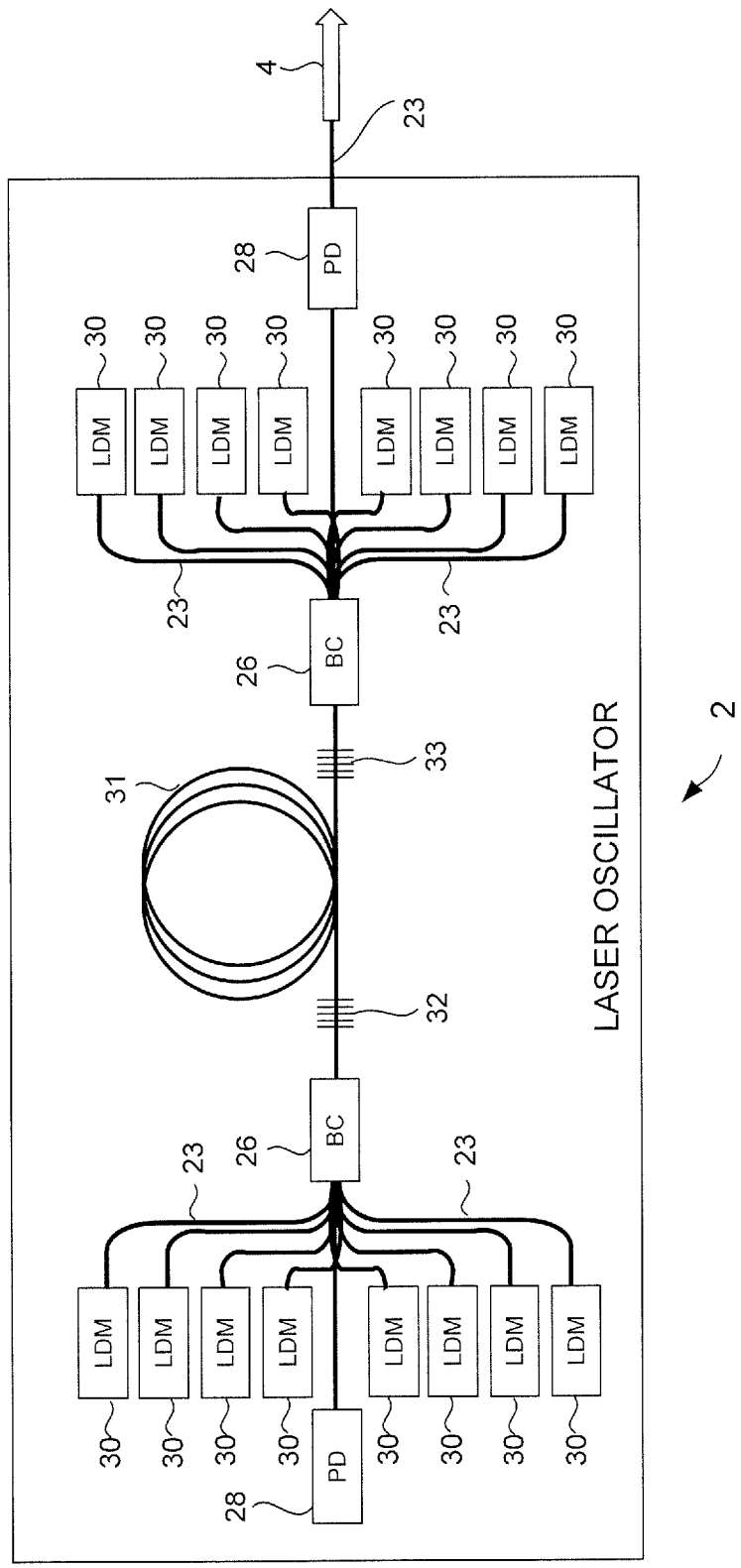

FIBER LASER DEVICE AND MACHINE LEARNING DEVICE

CROSS-REFERENCE TO RELATED APPLICATION

This application is a new U.S. patent application Ser. No. that claims benefit of Japanese Patent Application No. 2018-001500 filed Jan. 9, 2018, the disclosure of this application is being incorporated herein by reference in its entirety for all purposes.

BACKGROUND OF THE INVENTION

1. Field of the Invention

The present invention relates to a machine learning device for learning boundary conditions for failure occurrence caused by reflected light in a fiber laser device, and a fiber laser device to be controlled by referring to learning results of the machine learning device. Specifically, the fiber laser device emits laser light from an optical fiber to a workpiece to be machined, and machines the workpiece by, for example, cutting or welding, and the machine learning device learns boundary conditions for failure occurrence caused by light reflected from the workpiece or a component in a laser optical system in the fiber laser device, which may be the cause of failures in the fiber laser device, by using data acquired from the fiber laser device connected through communication means. A control unit in the fiber laser device refers to failure avoidance data output from the machine learning device on the basis of learning results of the machine learning device, and appropriately controls each unit constituting the fiber laser device in order to avoid failures caused by reflected light in accordance with detection results of the reflected light.

2. Description of the Related Art

A high-power fiber laser device for performing laser machining on a workpiece such as cutting and welding with laser light emitted from a machining head or the like through a laser optical system including an optical fiber has a problem in that a laser oscillator or a part of the laser optical system may be damaged by light reflected from a workpiece or a component in the laser optical system so that a failure occurs in the fiber laser device. Thus, in conventional fiber laser devices, in order to prevent damages by reflected light, laser oscillation is stopped or light output is reduced when detected energy of reflected light exceeds a predetermined level or when a period during which the detected energy exceeds a predetermined level exceeds a predetermined period.

However, the intensity of the reflected light instantaneously or irregularly fluctuates in many cases, and it is difficult to accurately grasp the boundary between conditions where a failure occurs and conditions where a failure does not occur, that is, boundary conditions for failure occurrence caused by reflected light. The boundary conditions for failure occurrence caused by reflected light are considered to depend on the structure of a fiber laser device and a driving history of the fiber laser device. To accurately grasp the boundary conditions for failure occurrence caused by reflected light, a destructive test for investigating marginal performance needs to be performed on a large number of fiber laser devices. However, fiber laser devices are expensive and it is difficult to perform a destructive test on a large number of fiber laser devices, and hence it is generally difficult to accurately grasp the boundary conditions for failure occurrence caused by reflected light.

In a situation where the boundary conditions for failure occurrence caused by reflected light are unknown, for example, control is performed to stop laser oscillation when the intensity of reflected light has exceeded a predetermined level. In this case, there is a risk that a failure occurs if the predetermined level is set too high, and hence the predetermined level is inevitably set low. Thus, there arises a problem in that laser oscillation is immediately stopped more than necessary upon the detection of reflected light even though a failure has not occurred, and as a result, laser machining cannot be performed or machining defects occur.

No document disclosing technology for solving this problem can be found. For example, Japanese Patent Application Laid-open No. 2007-042981 discloses an optical fiber laser including at least a rare earth-added optical fiber serving as a laser medium, a plurality of excitation light sources for optically exciting the rare earth-added optical fiber, and an beam combiner for causing excitation light beams from the excitation light sources to collectively enter the rare earth-added optical fiber, in which laser oscillation is performed by causing the excitation light beams to enter the rare earth-added optical fiber. The beam combiner is provided with a monitor port through which a part of light returning from the rare earth-added optical fiber to the excitation light source side propagates, and the optical fiber laser is also provided with excitation light source control means for measuring the intensity of the return light propagating through the monitor port, and when the light intensity has exceeded a predetermined value, reducing the output of the excitation light source to prevent amplification of the return light. When the light intensity of the return light, that is, reflected light, has exceeded the predetermined value, the output of the excitation light source is reduced. However, the above-mentioned patent document does not refer to determination of boundary conditions for failure occurrence caused by reflected light when setting such predetermining value, and does not disclose or suggest any solution to the technical problem to accurately grasp the boundary conditions for failure occurrence caused by reflected light.

Japanese Patent Application Laid-open No. 2017-131937 discloses a machine learning device for a laser device including at least one laser oscillator for emitting laser light to an object to be machined to perform machining such as cutting and welding and at least one laser power supply unit for supplying electric power to the laser oscillator, the machine learning device being configured to learn light output instruction data including a light output instruction for instructing the laser power supply unit at the start of the machining. The machine learning device includes a state quantity observation unit for observing a state quantity of the laser device including output data of an output light detection unit for measuring an output light amount that is the amount of the laser light output from the laser oscillator through a laser optical system and output data of a reflected light detection unit for measuring a reflected light amount that is the amount of reflected light obtained when the laser light is reflected by the surface of the object to be machined and reenters the laser oscillator and/or the laser optical system, an operation result acquisition unit for acquiring a result of success or failure of that start of machining with the laser light output from the laser oscillator on the basis of the light output instruction data, a learning unit for receiving an output from the state quantity observation unit and an output from the operation result acquisition unit and learning the light output instruction data including a light output instruction for instructing the laser power supply unit in association with the state quantity of the laser device and the result of success or failure of the machining start, and a decision making unit for referring to the light output instruction data learned by the learning unit to decide light output instruction data including a light output instruction for instructing the laser power supply unit. The machine learning device learns light output instruction data for starting the machining on the object to be machined within a predetermined period while satisfying the condition that the reflected light amount does not exceed a second predetermined level set higher than a first predetermined level. However, the above-mentioned patent literature does not indicate that boundary conditions for failure occurrence caused by reflected light are determined when determining the first predetermined level and the second predetermined level of the reflected light amount, and does not disclose or suggest any solution to the technical problem to accurately grasp the boundary conditions for failure occurrence caused by reflected light.

As described above, both of the publicly-known literatures indicate the technology for reducing the light output or controlling the light output so as not to exceed a predetermined level when the intensity or amount of reflected light detected by a reflected light detector exceeds a predetermined value, but do not indicate that the boundary conditions for failure occurrence caused by reflected light, based on which the predetermined value or the predetermined level is set, are determined when setting the predetermined value or the predetermined level, and do not disclose or suggest any solution to the technical problem to accurately grasp the boundary conditions for failure occurrence caused by reflected light.

As described above, a high-power fiber laser device has a problem in that a laser oscillator or a laser optical system may be damaged by light reflected from a workpiece or a component in the laser optical system so that a failure occurs. Thus, when the intensity or amount of reflected light detected by reflected light detection unit has exceeded a predetermined value or a predetermined level, control of stopping laser oscillation or reducing laser light output is performed in order to reduce the reflected light, thereby suppressing the occurrence of failures. In this case, no problem occurs if the predetermined value or the predetermined level is set such that, for example, a failure occurs when the intensity or amount of reflected light detected by the reflected light detection unit exceeds 1.25 times the predetermined value or the predetermined level, that is, set to an appropriate condition that the predetermined value or the predetermined level is about 80% of the boundary conditions for failure occurrence caused by reflected light and does not include an excessive margin.

However, the intensity of reflected light during actual laser machining instantaneously or irregularly fluctuates in many cases, and hence it is significantly difficult to accurately grasp the boundary conditions for failure occurrence caused by reflected light because the boundary conditions for failure occurrence caused by reflected light cannot be expressed by simple parameters, the boundary conditions for failure occurrence caused by reflected light depend on the structure of a fiber laser device and a driving history thereof, failures due to damage occur in different sites depending on where the reflected light is generated, and a large number of expensive fiber laser devices need to be broken if the boundary conditions for failure occurrence caused by reflected light are to be experimentally determined.

If the boundary conditions for failure occurrence caused by reflected light are unclear, there is a problem in that a failure may occur in a fiber laser device due to reflected light even though the above-mentioned predetermined value or predetermined level is appropriately set. In contrast, in general, it is desired to avoid a situation where a fiber laser device fails due to reflected light during laser machining in a field as much as possible. Accordingly, in the situation where the boundary conditions for failure occurrence caused by reflected light are unclear, the above-mentioned predetermined value or predetermined level is inevitably set low. In this case, however, although a failure due to reflected light does not occur, laser oscillation is stopped or laser light output is reduced even though the intensity or amount of the reflected light does not actually cause a problem.

Accordingly, there is a problem in that the fiber laser device is difficult to use because intended laser machining cannot be started in the beginning or laser light output is reduced during machining so that machining defects are more apt to occur.

As described above, it is significantly important to clarify the boundary conditions for failure occurrence caused by reflected light, but the conventional methods cannot accurately determine the boundary conditions for failure occurrence caused by reflected light because of the above-mentioned difficulty.

SUMMARY OF THE INVENTION

The problems to be solved by the present invention are therefore to provide a machine learning device capable of determining a boundary condition for failure occurrence caused by reflected light including dependency on the structure of a fiber laser device and a driving history thereof while minimizing the number of fiber laser devices that need to be subject to a destructive test, and to provide a fiber laser device that does not fail due to the reflected light, configured to refer to failure avoidance data set on the basis of learning results determined by the machine learning device such that laser oscillation is not stopped and light output is not reduced more than necessary for the purpose of avoiding a failure caused by reflected light.

A machine learning device according to one aspect of the present invention is connected to at least one fiber laser device for emitting laser light to machine a workpiece through communication means. The machine learning device includes: a state quantity observation unit for observing, as a state variable representing a driving state of the fiber laser device, a state quantity of the fiber laser device including at least time-series data on output light detection results obtained by detecting a light output of laser light emitted from the fiber laser device and time-series data on reflected light detection results obtained by detecting reflected light of the laser light; a determination data acquisition unit for acquiring determination data representing a failure occurrence situation in the fiber laser device as determined from a difference between the output light detection results and a light output instruction from a control unit in the fiber laser device; a learning unit for learning a boundary condition for failure occurrence caused by the reflected light by using the state variable and the determination data and associating the state quantity of the fiber laser device with the failure occurrence situation; and an output unit for outputting, on the basis of a learning result by the learning unit, at least one of failure avoidance data including information for avoiding a failure caused by the reflected light and failure occurrence boundary condition data.

A machine learning device according to another aspect of the present invention is connected to a control unit in at least one fiber laser device through communication means. The fiber laser device includes: at least one laser oscillator; a power supply unit for supplying a drive current to the laser oscillator; a laser optical system including a machining head for applying laser light emitted from the laser oscillator to a workpiece, which is an object to be machined by laser, through an optical fiber; at least one output light detection unit for detecting a light output of the laser light emitted from the laser oscillator; at least one reflected light detection unit for detecting reflected light that has been reflected by the workpiece or a component included in the laser optical system and has returned to the laser oscillator or the laser optical system; and a control unit for at least outputting a current output instruction corresponding to a light output instruction to the power supply unit and receiving detection signals from the output light detection unit and the reflected light detection unit. On the other hand, the machine learning device includes: a state quantity observation unit for observing, as a state variable representing a driving state of the fiber laser device, a state quantity of the fiber laser device including at least time-series data on output light detection results detected by the output light detection unit and reflected light detection results detected by the reflected light detection unit; a determination data acquisition unit for acquiring determination data representing a failure occurrence situation in the fiber laser device as determined from a difference between at least light output results detected by the output light detection unit and the light output instruction; a learning unit for learning a boundary condition for failure occurrence caused by the reflected light in the fiber laser device by using the state variable and the determination data and associating the state quantity of the fiber laser device with the failure occurrence situation; and an output unit for outputting, on the basis of a learning result by the learning unit, at least one of failure occurrence boundary condition data and failure avoidance data including information for avoiding a failure caused by reflected light.

At least one of the fiber laser devices connected to the machine learning device through the communication means via the control unit may be a limitation characteristic test fiber laser device, which is the fiber laser device for a limitation characteristic test.

At least one of a structure, a configuration, a model, a drawing number, specifications, a date of manufacture, a production lot, a location of manufacture, and a product number of the fiber laser device may be included in the state quantity of the fiber laser device observed by the state quantity observation unit, as manufacturing condition data on the fiber laser device.

The learning unit may use the state variable including the manufacturing condition data and the determination data and associate the state quantity of the fiber laser device including the manufacturing condition data with the failure occurrence situation to learn manufacturing condition dependency of the boundary condition for failure occurrence caused by reflected light in addition to the boundary condition for failure occurrence caused by reflected light in the fiber laser device.

The machine learning device may further include a history recording unit, and record, for each fiber laser device connected through the communication means via the control unit, history data on a state quantity of the fiber laser device observed by the state quantity observation unit in the history recording unit, as a state quantity history. On the other hand, the learning unit may use the state variable of the fiber laser device including the state quantity history of the fiber laser device recorded in the history recording unit and the determination data and associate the state quantity of the fiber laser device including the state quantity history with the failure occurrence situation to learn state quantity history dependency of the boundary condition for failure occurrence caused by reflected light in addition to the boundary condition for failure occurrence caused by reflected light in the fiber laser device.

The machine learning device may be configured to: select, on the basis of at least a learning result of the state quantity history dependency of the boundary condition for failure occurrence caused by reflected light in the fiber laser device, at least one state quantity, the history of which has a predetermined level or more of influence on the boundary condition for failure occurrence caused by reflected light; and avoid recording histories of one or more state quantities except for a history of the selected state quantity in the history recording unit.

The machine learning device may instruct the control unit in the fiber laser device to drive the fiber laser device under predetermined driving conditions, which are driving conditions determined in advance, in accordance with a predetermined schedule, and may record at least the state quantity of the fiber laser device obtained each time the fiber laser device is driven under the predetermined driving conditions, in the history recording unit as the state quantity history of the fiber laser device.

The machine learning device may instruct a control unit in a fiber laser device newly connected to the communication means to which the machine learning device is connected, to drive the fiber laser device under predetermined initial driving conditions, which are initial driving conditions determined in advance, and may record at least the state quantity of the fiber laser device obtained when the fiber laser device is driven under the predetermined initial driving conditions, in the history recording unit as the state quantity history of the fiber laser device.

The machine learning device may be configured to: predict, on the basis of a learning result by the learning unit, for the at least one limitation characteristic test fiber laser device, the boundary condition for failure occurrence caused by reflected light in the limitation characteristic test fiber laser device; and output a limitation characteristic test condition program with which effective test data is estimated to be obtained by a limitation characteristic test, from the output unit as the failure avoidance data.

When a failure by reflected light occurs while the limitation characteristic test is executed in accordance with the limitation characteristic test condition program, the learning unit may extract the state quantity of the fiber laser device including the reflected light detection result detected by the reflected light detection unit or a change in the state quantity for a test conducted under test conditions before a failure by reflected light occurs, construct a learning model for exploring for features of the extracted state quantity or the extracted change in the state quantity, and learn a precursor of failure caused by reflected light while the limitation characteristic test is executed in accordance with the limitation characteristic test condition program.

On the basis of a learning result related to the precursor, when a precursor of failure caused by reflected light is observed in the state quantity of the fiber laser device including the reflected light detection result detected by the reflected light detection unit or the change in the state quantity while the limitation characteristic test is executed in accordance with the limitation characteristic test condition program, the machine learning device may output the failure avoidance data for instructing suspension of the test according to the limitation characteristic test condition program or change of the limitation characteristic test condition program, to the control unit in the fiber laser device.

The machine learning device may output, from the output unit and on the basis of a learning result including at least a learning result of the boundary condition for failure occurrence caused by reflected light, a failure avoidance critical condition for the state quantity of the fiber laser device including the reflected light detection result detected by the reflected light detection unit, under which a driving condition of the fiber laser device needs to be changed in order to avoid a failure by reflected light, or the failure avoidance critical condition and a failure avoidance driving condition that is the driving condition of the fiber laser device for avoiding a failure by reflected light when the failure avoidance critical condition is reached, to the control unit in each of the fiber laser devices connected through the communication means as the failure avoidance data.

The failure avoidance driving condition of the fiber laser device for avoiding a failure by reflected light when the failure avoidance critical condition is reached may include at least one of a laser light output condition corresponding to the light output instruction, a relative position condition between the machining head and the workpiece, a relative position condition between a focal point of laser light emitted from the machining head and the workpiece, an F-number condition of a condensing optical system of the machining head, and a beam profile condition of a laser beam emitted from the machining head.

The machine learning device may learn the failure occurrence boundary condition by a simplified method in which, at least in an initial stage of learning, for at least one site to fail, at least an upper limit temperature of the site, a heat capacity of the site, and a thermal resistance from the site to a heat sink are determined.

The machine learning device may be provided in plurality, and the respective machine learning devices may be connected to a host signal processing device through communication means and capable of sharing results learned by the machine learning devices.

A fiber laser device according to one aspect of the present invention is connected to the above-mentioned machine learning device through the communication means, in which the control unit in the fiber laser device refers to the failure avoidance data output from the output unit on the basis of a learning result of the learning unit in the machine learning device to control at least one unit constituting the fiber laser device in order to avoid a failure caused by reflected light.

The fiber laser device may further include a failure avoidance data recording unit for recording the failure avoidance data output from the output unit in the machine learning device, the failure avoidance data may be recorded in the failure avoidance data recording unit, and the control unit in the fiber laser device may refer to the failure avoidance data recorded in the failure avoidance data recording unit to control at least one unit constituting the fiber laser device in order to avoid a failure caused by reflected light.

At least one of the reflected light detection units can include a photodiode.

The fiber laser device may further include a plurality of the reflected light detection units, and the plurality of the reflected light detection units may include at least one reflected light detection unit for detecting reflected light that propagates through a core of the optical fiber, and at least one reflected light detection unit for detecting reflected light that propagates through a clad of the optical fiber.

At least one of the reflected light detection units may be temperature detection unit.

The present invention can provide a machine learning device capable of progressing learning of boundary conditions for failure occurrence caused by reflected light including manufacturing condition dependency and state quantity history dependency of a fiber laser device while minimizing the number of fiber laser devices that need to be broken in order to obtain a learning result, and capable of outputting, on the basis of the learning result, failure avoidance data such as a failure avoidance critical condition and a failure avoidance driving condition corresponding to a fiber laser device to each fiber laser device connected through communication means.

The present invention can provide a high-performance and highly-reliable fiber laser device capable of referring to failure avoidance data such as a failure avoidance critical condition and a failure avoidance driving condition output from the machine learning device of the present invention such that a failure by reflected light does not occur and the occurrence of a machining defect caused by a change of driving conditions for avoiding a failure by reflected light is minimized.

BRIEF DESCRIPTION OF THE DRAWINGS

FIG. 4A and FIG. 4B are flowcharts illustrating an example of operation of the machine learning device illustrated in FIG. 3;

FIG. 17 is a block diagram illustrating a conceptual configuration of a laser oscillator constituting the fiber laser device in FIG. 16.

DETAILED DESCRIPTION OF THE PREFERRED EMBODIMENTS

Examples of a machine learning device and a fiber laser device according to the present invention are described below with reference to the drawings. In the figures, the same members are denoted by the same reference symbols. The same reference symbols in different figures mean components having the same functions.

Note that the scales are changed as appropriate for easier understanding of the figures.

First Embodiment

Figure 1:
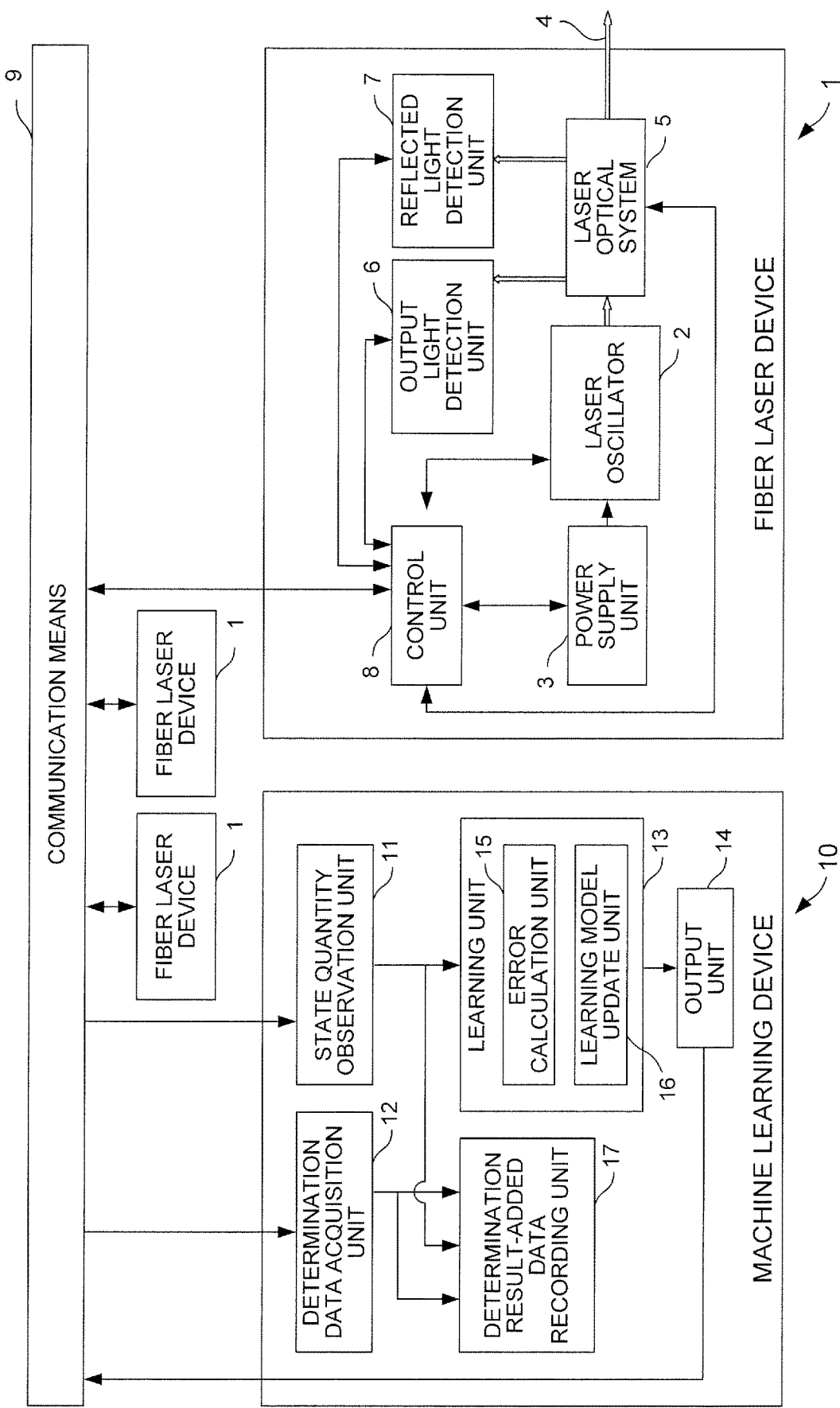
FIG. 1 is a block diagram illustrating conceptual configurations of a machine learning device and a fiber laser device according to a first embodiment of the present invention.

FIG. 1 is a block diagram illustrating a conceptual configuration of a machine learning device 10 according to a first embodiment of the present invention, illustrating a state in which the machine learning device 10 is connected to three fiber laser devices 1 through communication means 9. Of the three fiber laser devices 1, a right fiber laser device 1 is illustrated by a block diagram illustrating a conceptual configuration of the fiber laser device 1.

The fiber laser device 1 includes a laser oscillator 2, a power supply unit 3 for supplying a drive current to the laser oscillator 2, a laser optical system 5 including a machining head for irradiating a workpiece (not shown), which is an object to be machined by laser, with laser light 4 emitted from the laser oscillator 2 through an optical fiber, an output light detection unit 6 for detecting a light output of laser emitted from the laser oscillator 2, a reflected light detection unit 7 for detecting reflected light that has returned from the workpiece or a transmissive window or an end surface of a fiber connector included in the laser optical system 5 to the laser oscillator 2 or the laser optical system 5, and a control unit 8 for outputting a current output instruction corresponding to a light output instruction to the power supply unit 3 and receiving detection signals from the output light detection unit 6 and the reflected light detection unit 7.

The control unit 8 is connected to a communication means 9 such as a network, and exchanges information with the machine learning device 10. The control unit 8 can output the state of each unit constituting the fiber laser device 1 to the machine learning device 10 through the communication means 9. The control unit 8 may have an internal or external memory so that at least one of the structure, the configuration, the model, the drawing number, the specifications, the date of manufacture, the production lot, the location of manufacture, and the product number of a corresponding fiber laser device 1 is recorded as manufacturing condition data on the fiber laser device 1, and output the recorded contents to the machine learning device 10 through the communication means 9.

Note that a plurality of the laser oscillators 2, a plurality of the power supply units 3, a plurality of the output light detection unit 6, and a plurality of the reflected light detection units 7 may be included in one fiber laser device 1. For example, the laser optical system 5 may include a beam combiner for coupling a plurality of laser light beams, and the fiber laser device 1 may include a plurality of power supply units 3 capable of independently supplying drive currents to a plurality of laser oscillators 2, a plurality of output light detection units 6 for detecting light outputs of the laser oscillators 2 and light outputs of the coupled laser light beams, and a plurality of reflected light detection units 7 for detecting reflected light beams that have returned to the laser oscillators 2 and the units in the laser optical system 5.

Note that, by including the manufacturing condition data on the fiber laser device 1 such as the structure, the configuration, the model, the drawing number, the specifications, the date of manufacture, the production lot, the location of manufacture, and the product number of the fiber laser device 1 in the state quantity of the fiber laser device 1 observed by a state quantity observation unit 11 in the machine learning device 10, the dependency of a boundary condition for failure occurrence caused by reflected light in the fiber laser device 1 on the manufacturing conditions such as the structure and the configuration can be also learned by machine learning described later, and even when the design of the fiber laser device 1 is changed, a change in the boundary condition for failure occurrence caused by reflected light can be predicted to obtain learning results early.

On the other hand, the machine learning device 10 includes a state quantity observation unit 11 for observing, as a state variable indicating a driving state of the fiber laser device 1, a state quantity of the fiber laser device 1 including time-series data on at least output light detection results detected by the output light detection unit 6 and reflected light detection results detected by the reflected light detection unit 7, a determination data acquisition unit 12 for acquiring determination data representing a failure occurrence situation in the fiber laser device 1 determined from a difference between at least the light output result detected by the output light detection unit 6 and the light output instruction, a learning unit 13 for using the state variable and the determination data and associating the state quantity of the fiber laser device 1 with the failure occurrence situation to learn a boundary condition for failure occurrence caused by reflected light in the fiber laser device 1, and an output unit 14 for determining, on the basis of a learning result by the learning unit 13, failure avoidance data to be output to each fiber laser device 1, and outputting the failure avoidance data to each fiber laser device 1.

The failure avoidance data to be output to each fiber laser device 1 may be a condition that the driving conditions of the fiber laser device 1 including the light output instruction should be changed in order to avoid a failure in the fiber laser device 1 under a condition corresponding to, for example, 80% of a boundary condition for failure occurrence caused by reflected light acquired by a result of learning, that is, may be a failure avoidance critical condition. Note that, in regard to the failure avoidance data such as the failure avoidance critical condition, it is also desired that the control unit 8 record the latest failure avoidance data in an internal or external memory so that the driving condition can be changed without a time delay in order to avoid a failure.

Note that what is observed as the state quantity of the fiber laser device 1 is not limited to the output light detection results such as the light output energy and the light output waveform detected by the output light detection unit 6 and the reflected light detection results such as the reflected light energy and the reflected light waveform detected by the reflected light detection unit 7, and may include environmental temperature, temperature in the fiber laser device, environmental humidity, humidity in the fiber laser device, water temperature of coolant, temperature of each unit constituting the laser oscillator 2 and the laser optical system 5, and vibration applied to the fiber laser device 1.

This embodiment describes an example of the machine learning device 10 to which supervised learning is applied, and the learning unit 13 includes an error calculation unit 15 and a learning model update unit 16. The machine learning device 10 also includes a determination result-added data recording unit 17. The determination result-added data recording unit 17 may record determination result-added data in which the state quantity of the fiber laser device 1 and the determination result obtained so far are paired, and provide the determination result-added data to the error calculation unit 15. Note that the determination result-added data recording unit 17 is not necessarily required to be provided inside the machine learning device 10, and the determination result-added data may be provided to the error calculation unit 15 through a memory card or the communication means 9.

Figure 2A:
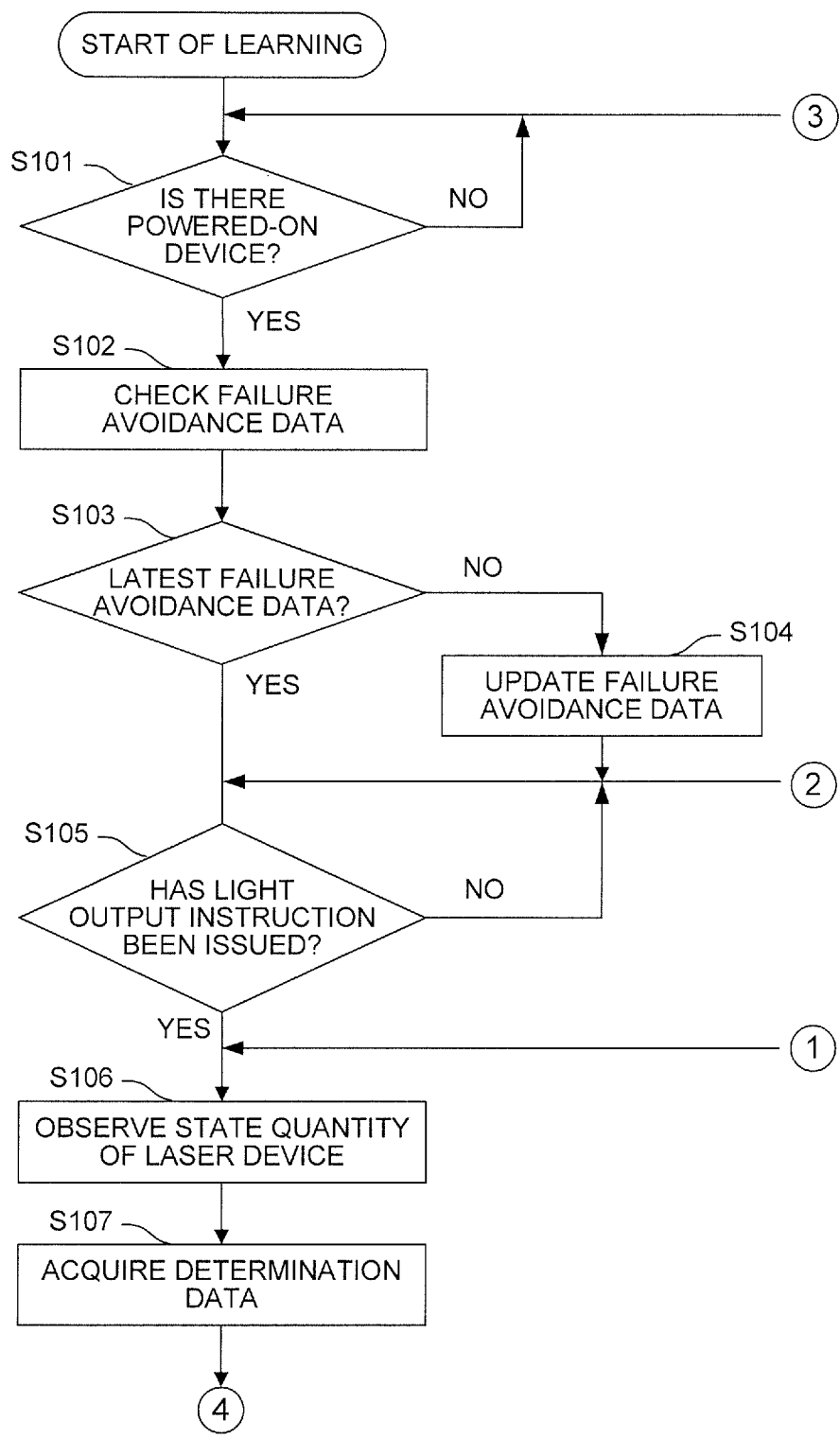
FIG. 2A and FIG. 2B are flowcharts illustrating an example of operation of the machine learning device illustrated in FIG. 1.
Figure 2B:
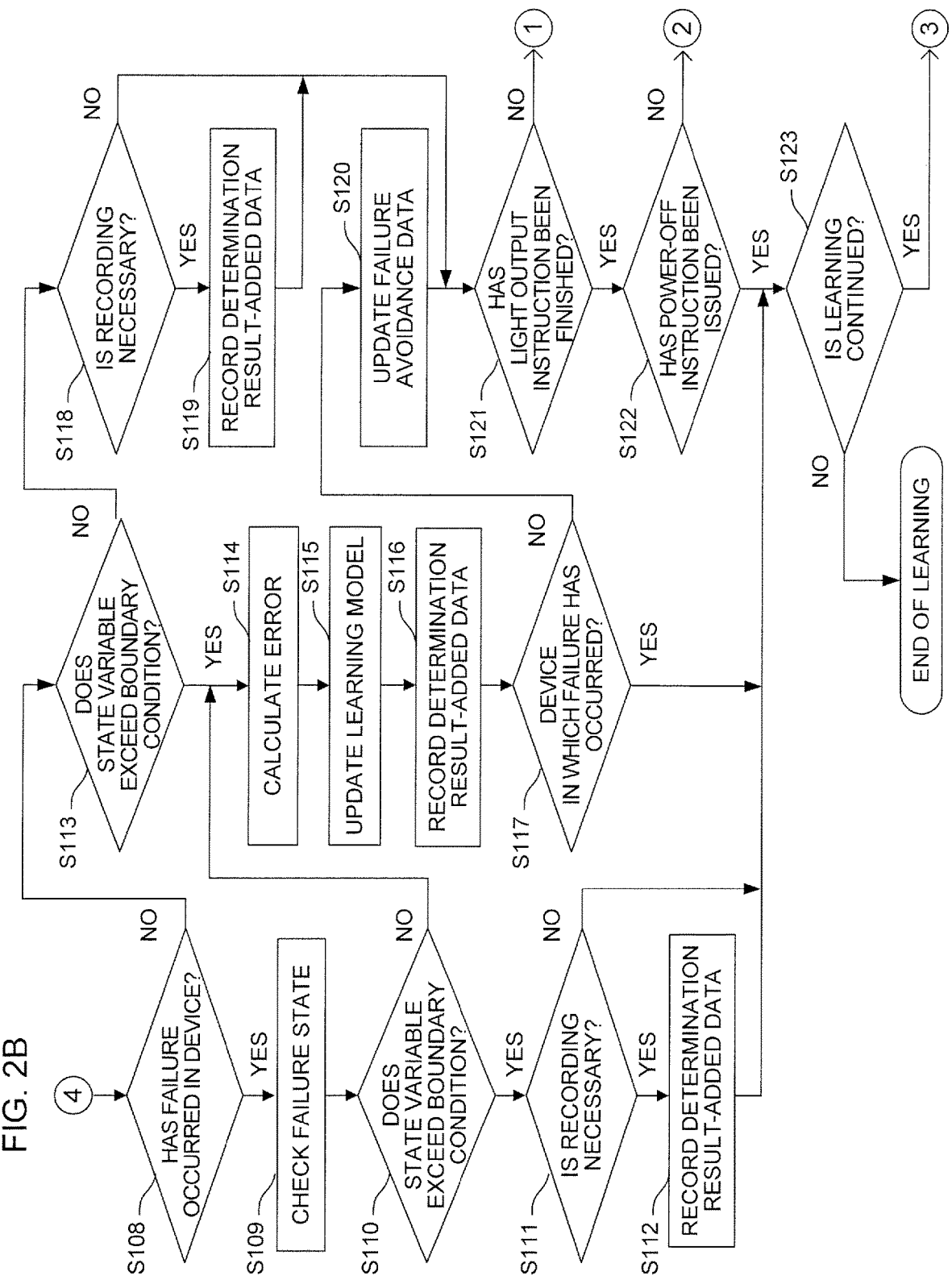

FIG. 2A and FIG. 2B are flowcharts illustrating an example of operation of the machine learning device 10 illustrated in FIG. 1.

As illustrated in FIG. 2A and FIG. 2B, in the machine learning device 10 illustrated in FIG. 1, when learning operation (learning processing) is started, the machine learning device 10 determines whether there is a powered-on fiber laser device 1 in a plurality of fiber laser devices 1 connected through the communication means 9 (Step S101). When there is a powered-on fiber laser device 1, the machine learning device 10 checks failure avoidance data recorded in the fiber laser device 1 (Step S102), and determines whether the failure avoidance data is the latest data (Step S103).

When the failure avoidance data is not the latest data, the machine learning device 10 updates the failure avoidance data with the latest failure avoidance data (Step S104), and the flow proceeds to Step S105. When the machine learning device 10 determines in Step S103 that the failure avoidance data is the latest data, on the other hand, the flow directly proceeds to Step S105. In Step S105, the machine learning device 10 determines whether a light output instruction has been issued to the fiber laser device 1.

When the light output instruction has been issued, the state quantity observation unit 11 observes a state quantity including time-series data on at least output light detection results detected by the output light detection unit 6 in the fiber laser device 1 and reflected light detection results detected by the reflected light detection unit 7 as a state variable representing the driving state of the fiber laser device 1, and inputs the state variable to the learning unit 13 (Step S106). The determination data acquisition unit 12 acquires determination data representing a failure occurrence situation in the fiber laser device 1 determined from a difference exceeding an error such as a measurement error between at least light output results detected by the output light detection unit 6 and the light output instruction, and inputs the determination data to the learning unit 13 (Step S107).

Subsequently, the machine learning device 10 determines from the determination data whether a failure has occurred in the fiber laser device 1 (Step S108). When it is determined that a failure has occurred in the fiber laser device 1, the machine learning device 10 executes an automatic failure diagnosis program, or checks a failure state such as a faulty site by human intervention because the occurrence frequency of a failure is low (Step S109). The machine learning device 10 determines whether the state variable representing the driving state of the fiber laser device 1 observed by the state quantity observation unit 11 when the failure has occurred exceeds a boundary condition for failure occurrence caused by reflected light as obtained by learning results so far (Step S110).

In a fiber laser device 1 actually used for laser machining in a manufacturing scene, when the state variable exceeds the failure avoidance critical condition set on the safer side than the boundary condition for failure occurrence caused by reflected light, the driving conditions of the fiber laser device 1 including the light output instruction are changed in order to avoid a failure in the fiber laser device 1, and hence the state variable never exceeds the boundary condition for failure occurrence caused by reflected light as obtained from learning results so far. However, in a limitation characteristic test fiber laser device that is set such that, in order to acquire a boundary condition for failure occurrence caused by reflected light, an avoidance action for avoiding a failure in the fiber laser device 1 is not always taken when the state variable exceeds the boundary condition for failure occurrence caused by reflected light, the state variable may possibly exceed the failure avoidance critical condition.

When a faulty fiber laser device 1 is a limitation characteristic test fiber laser device and when the state variable exceeds the boundary condition for failure occurrence caused by reflected light, the machine learning device 10 determines whether to record the state variable in the determination result-added data recording unit 17 as determination result-added data (Step S111). When it is determined to record the state variable as determination result-added data, the machine learning device 10 records the determination result-added data in the determination result-added data recording unit 17 (Step S112), and the flow proceeds to Step S123. The determination as to whether to record the state variable as determination result-added data may be performed in a manner that the state variable representing the driving state obtained when a failure has occurred in the fiber laser device 1 satisfies a condition corresponding to, for example, 120% or less of the boundary condition for failure occurrence caused by reflected light is effective for reinforcing the learning result and determined to be recorded, because a condition which is much apart from the boundary condition for failure occurrence caused by reflected light as obtained from learning results so far and with which a failure occurs without exception (it is not conceivable to perform a test under test conditions that cause a useless failure even in a limitation characteristic test fiber laser device) is meaningless.

When it is determined in Step S111 that it is not necessary to record the determination result-added data, on the other hand, the flow directly proceeds to Step S123. In Step S123, the machine learning device 10 determines whether an instruction to continue learning has been issued. When an instruction to continue learning has not been issued, the learning is finished. When an instruction to continue learning has been issued, the flow returns to Step S101, and the learning is continued.

When it is determined in Step S110 that the state variable representing the driving state of the fiber laser device 1 observed by the state quantity observation unit 11 when a failure has occurred does not exceed the boundary condition for failure occurrence caused by reflected light as obtained from learning results so far although the failure has occurred in the fiber laser device 1, it means that the failure has occurred even though the state variable does not exceed the boundary condition for failure occurrence caused by reflected light as obtained from learning results so far, and hence the machine learning device 10 calculates a difference between the state variable representing the driving state of the fiber laser device 1 when the failure has occurred and the boundary condition for failure occurrence caused by reflected light as obtained from learning results so far as an error (Step S114). The machine learning device 10 updates a learning model such that the error approaches zero (Step S115), and records the state variable at the time of the occurrence of the failure in the determination result-added data recording unit 17 as determination result-added data indicating that the failure has occurred (Step S116). The machine learning device 10 determines whether the fiber laser device is a fiber laser device 1 in which the failure has currently occurred (Step S117).

When determination result is NO in Step S110 and the flow proceeds to Step S114, the fiber laser device 1 is a fiber laser device 1 in which the failure has currently occurred, and hence the power is turned off for repair. Thus, the fiber laser device 1 cannot be accessed by the machine learning device 10, and hence the flow proceeds from Step S117 (determination result: YES) to Step S123 to determine whether an instruction to continue learning has been issued. When an instruction to continue learning has not been issued, the learning is finished. When an instruction to continue learning has been issued, on the other hand, the flow returns to Step S101, and the learning is continued.

On the other hand, when it is determined in Step S108 that a failure has not occurred in the fiber laser device 1 from the determination data, the machine learning device 10 determines whether the state variable representing the driving state of the fiber laser device 1 observed by the state quantity observation unit 11 exceeds the boundary condition for failure occurrence caused by reflected light as obtained from learning results so far (Step S113). When it is determined that the state variable representing the driving state of the fiber laser device 1 observed by the state quantity observation unit 11 exceeds the boundary condition for failure occurrence caused by reflected light as obtained from learning results so far, it means that a failure has not actually occurred even though the state variable exceeds the boundary condition for failure occurrence caused by reflected light as obtained from learning results so far, and hence the machine learning device 10 calculates a difference between the boundary condition for failure occurrence caused by reflected light as obtained from learning results so far and the state variable representing the driving state of the fiber laser device 1 as an error (Step S114) (also in this case, in a fiber laser device 1 actually used for laser machining in a manufacturing scene, when the state variable exceeds the failure avoidance critical condition set on the safer side than the boundary condition for failure occurrence caused by reflected light, the driving conditions of the fiber laser device 1 including the light output instruction are changed in order to avoid a failure in the fiber laser device 1, and hence the state variable never exceeds the boundary condition for failure occurrence caused by reflected light as obtained from learning results so far. However, a failure occurs only in a limitation characteristic test fiber laser device that is set such that an avoidance action for avoiding a failure in the fiber laser device 1 is not always taken when the state variable exceeds the boundary condition for failure occurrence caused by reflected light.). The machine learning device 10 updates the learning model such that the error approaches zero (Step S115), and records the state variable at the time of the occurrence of the failure in the determination result-added data recording unit 17 as determination result-added data indicating that the failure has occurred (Step S116). The machine learning device 10 determines whether the fiber laser device 1 is a fiber laser device 1 in which the failure has currently occurred (Step S117).

When determination result is NO in Step S108 and the flow proceeds to Step S113, the fiber laser device 1 is not a fiber laser device 1 in which the failure has occurred (determination result in Step S117: NO), and the fiber laser device 1 can be accessed by the machine learning device 10. Thus, the machine learning device 10 outputs failure avoidance data updated by the updated learning model to at least the fiber laser device 1 and another fiber laser device 1 that is powered on at that time among the fiber laser devices 1 connected through the communication means 9 (Step S120). Subsequently, in Step S121, the machine learning device 10 determines whether the execution of the light output instruction on the fiber laser device 1 has been finished. When the execution of the light output instruction has not been finished, the flow returns to Step S106, and the state quantity observation unit 11 continues observing the state quantity of the fiber laser device 1. When the execution of the light output instruction has been finished, on the other hand, the machine learning device 10 further determines whether an instruction to power off the fiber laser device 1 has been issued (Step S122). When an instruction to power off the fiber laser device 1 has not been issued, the flow returns to Step S105 to wait for a new light output instruction issued to the fiber laser device 1. When an instruction to power off the fiber laser device 1 has been issued, the flow proceeds to Step S123 to determine whether an instruction to continue learning has been issued. When an instruction to continue learning has not been issued, the learning is finished. When an instruction to continue learning has been issued, on the other hand, the flow returns to Step S101, and the learning is continued.

When it is determined in Step S113 that the state variable representing the driving state of the fiber laser device 1 observed by the state quantity observation unit 11 does not exceed the boundary condition for failure occurrence caused by reflected light as obtained from learning results so far, the flow proceeds to Step S118. Because determination result is NO in Step S108 and the flow proceeds to Step S113, this state in which no failure has occurred in the fiber laser device 1 and the state variable does not exceed the boundary condition for failure occurrence caused by reflected light is extremely normal. In a fiber laser device 1 actually used for laser machining in a manufacturing scene, when the state variable exceeds the failure avoidance critical condition set on the safer side than the boundary condition for failure occurrence caused by reflected light, the driving conditions of the fiber laser device 1 including the light output instruction are changed in order to avoid a failure in the fiber laser device 1. Thus, if the learning progresses and the precision of the boundary condition for failure occurrence caused by reflected light corresponding to the learning result improves, the flow is expected to always go through this path (Step S108→Step S113→Step S118).

In Step S118, the machine learning device 10 determines whether to record a pair of the state variable and determination result of non-occurrence of failure in the determination result-added data recording unit 17 as determination result-added data. When it is determined to record the state variable, the machine learning device 10 records the determination result-added data in the determination result-added data recording unit 17 (Step S119), and the flow proceeds to Step S121. In regard to the determination as to whether to record the pair of the state variable and determination result of non-occurrence of failure as determination result-added data, if conditions which are much apart from the boundary conditions for failure occurrence caused by reflected light as obtained from learning results so far and under which a failure is expected to hardly occur are recorded, only the data volume is increased and this is meaningless. Thus, when a failure avoidance action for avoiding a failure is taken with, for example, 80% or more of the boundary condition for failure occurrence caused by reflected light (when the state variable representing the driving state of the fiber laser device 1 is originally a state variable for which a failure avoidance action for avoiding a failure should be taken during the execution of the limitation characteristic test), this data is effective for reinforcing the learning result, and may be determined to be recorded. On the other hand, when it is determined in Step S118 that it is unnecessary to record the state variable at the time of the non-occurrence of the failure as determination result-added data, the flow directly proceeds to Step S121. The processing of Step S121 and thereafter is as described above, and hence the description thereof is omitted.

By repeating Steps S101 to S123 described above, the learning unit 13 repeatedly updates the learning model to learn the boundary condition for failure occurrence caused by reflected light.

Note that the above descriptions of Steps S101 to S123 are descriptions of an operation example of one of fiber laser devices 1 connected to the machine learning device 10 through the communication means 9. When a plurality of fiber laser devices 1 are connected to the machine learning device 10 through the communication means 9 and are simultaneously powered on, the operations of Steps S101 to S123 are simultaneously performed on the fiber laser devices 1. Thus, the learning unit 13 can include a plurality of learning models as needed.

In view of an example of the operation described above, some limitation characteristic test fiber laser devices are needed in order to progress the learning. A method for obtaining effective learning results by as small a number of limitation characteristic test fiber laser devices as possible is described in the following embodiments. As described above, the manufacturing condition data on a fiber laser device such as the structure, the configuration, the model, the drawing number, the specifications, the date of manufacture, the production lot, the location of manufacture, and the product number of the fiber laser device 1 is included in the state quantity of the fiber laser device 1 observed by the state quantity observation unit 11 such that the dependency of the boundary condition for failure occurrence caused by reflected light in the fiber laser device 1 on the manufacturing conditions such as the structure and the configuration is also learned, and hence even when the design of the fiber laser device 1 has changed, it is not necessarily required to perform a limitation characteristic test using a limitation characteristic test fiber laser device, and the number of fiber laser devices 1 damaged by the execution of the limitation characteristic test can be reduced. As the learning progresses, information on manufacturing conditions required for the fiber laser device 1 under which a failure by reflected light is less likely to occur can be acquired from the learning result, which can lead to the development of a more reliable fiber laser device 1.

Note that, as an example of supervised learning by a machine learner, the learning is progressed in a manner that, for example, a predictive model regression equation as expressed by the following Equation (1) is set, and the values of coefficients $a_0$, $a_1$, $a_2$, $a_3$, ... are adjusted so that the value of an objective variable y is obtained when the values taken by state variables $x_1$, $x_2$, $x_3$, ... in the learning process are substituted into the regression equation. Note that the learning method is not limited thereto, and is different depending on the algorithm of supervised learning.

$$y = a_0 + a_1 x_1 + a_2 x_2 + a_3 x_3 + \ldots + a_n x_n \tag{1}$$

As the algorithm of supervised learning, various methods such as neural networks and the method of least squares are well known. Any supervised learning algorithm can be employed as a method applied to the present invention.

Second Embodiment

Figure 3:
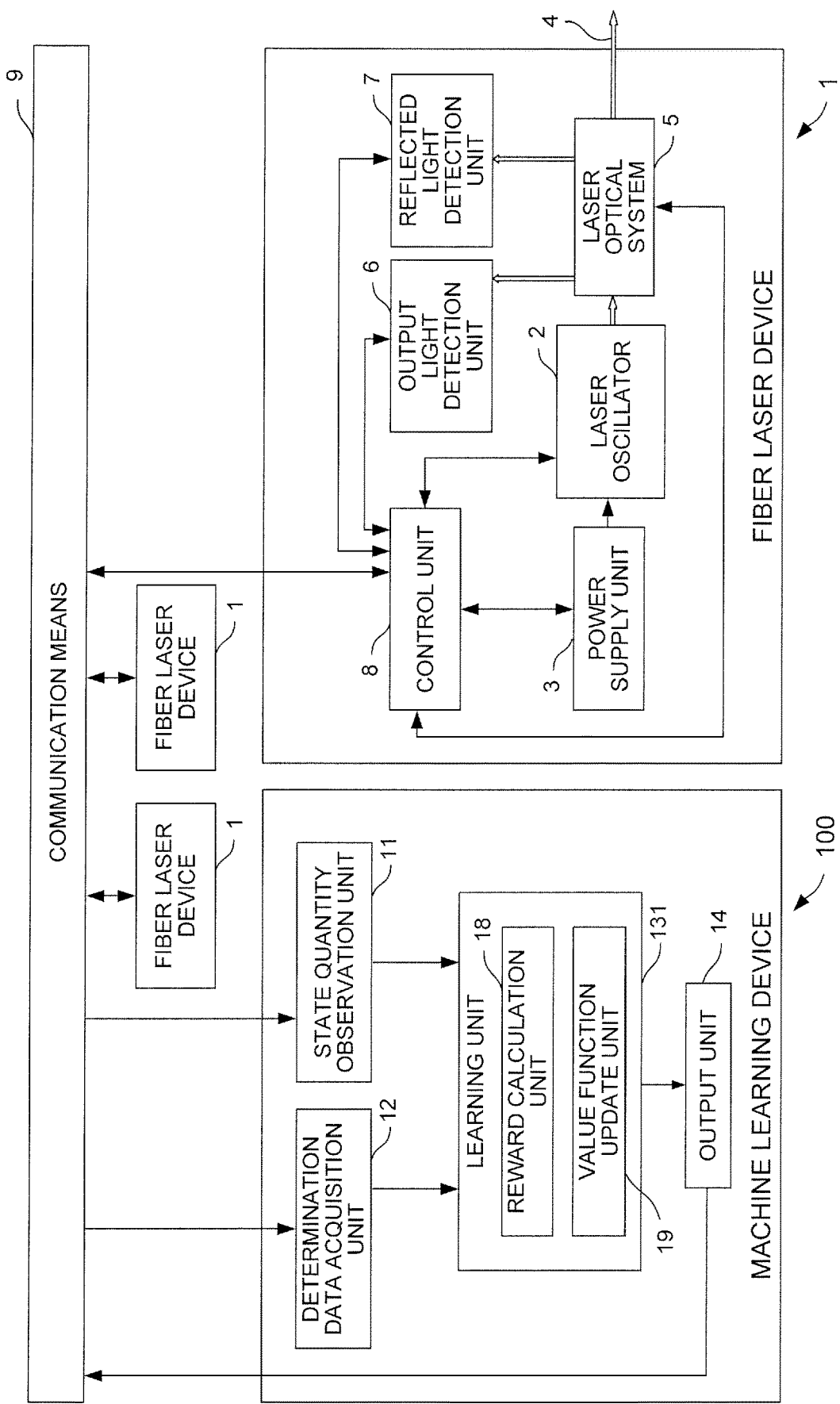
FIG. 3 is a block diagram illustrating conceptual configurations of a machine learning device and a fiber laser device according to a second embodiment of the present invention.

FIG. 3 is a block diagram illustrating a conceptual configuration of a machine learning device 100 according to a second embodiment of the present invention, illustrating a state in which the machine learning device 100 is connected to three fiber laser devices 1 through communication means 9. A fiber laser device 1 on the right side of the three fiber laser devices 1 is illustrated by a block diagram illustrating a conceptual configuration of the fiber laser device 1.

The configuration of the fiber laser device 1 in this embodiment is the same as in FIG. 1 (the fiber laser device in the first embodiment). Unlike FIG. 1, this embodiment illustrates an example of the machine learning device 100 to which reinforcement learning is applied. A learning unit 131 includes a reward calculation unit 18 and a value function update unit 19 instead of the error calculation unit 15 and the learning model update unit 16. The learning unit 131 does not include the determination result-added data recording unit 17.

Figure 4A:
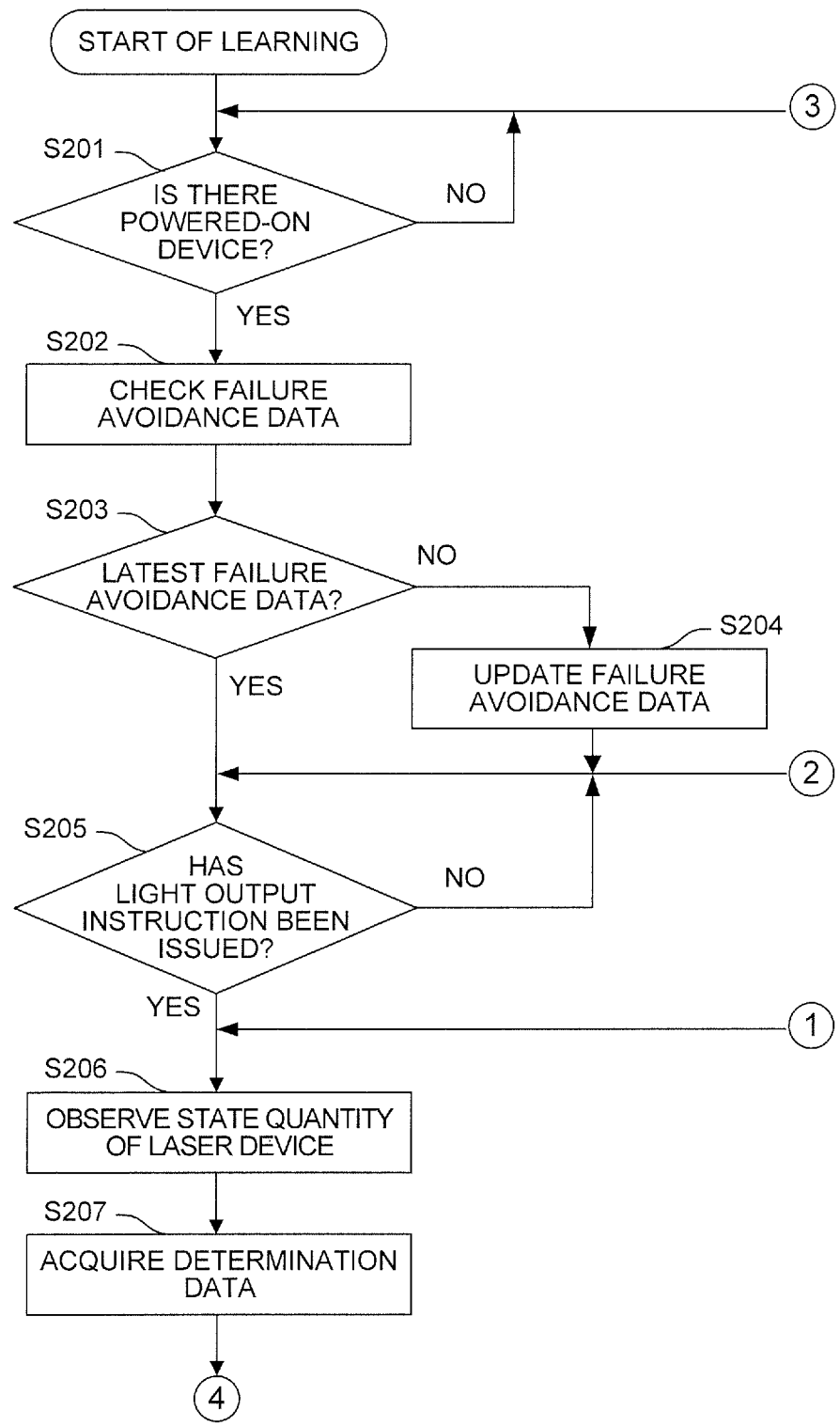

FIG. 4A and FIG. 4B are flowcharts illustrating an example of operation of the machine learning device 100 illustrated in FIG. 3. Steps S201 to S210 in the flowcharts in FIG. 4A and FIG. 4B are the same as Steps S101 to S110 in the flowcharts in FIG. 2A and FIG. 2B, and hence descriptions thereof are omitted.

In Step S210, the situation where the state variable representing the driving state of the fiber laser device 1 observed by the state quantity observation unit 11 when a failure has occurred exceeds the boundary condition for failure occurrence caused by reflected light as obtained from the learning results so far can occur only in a limitation characteristic test fiber laser device as long as the failure avoidance operation normally operates as described above. When the state variable representing the driving state of the fiber laser device 1 exceeds the boundary condition for failure occurrence caused by reflected light as obtained from the learning results so far, the machine learning device 100 determines whether data on the result that the fiber laser device 1 is faulty is effective data (Step S211). When it is determined that the data is effective data, it means that the result of failure occurrence predicted from the learning result matches the result that a failure has actually occurred, and hence the machine learning device 100 sets a positive reward (Step S212), and updates a value function (Step S214). The determination as to whether the data is effective in Step S211 may be performed as follows. Data of a condition in which the state variable representing the driving state when the fiber laser device 1 has failed is much apart from the boundary condition for failure occurrence caused by reflected light as obtained from learning results so far and a failure occurs without exception is not effective. Thus, for example, a condition of the state variable representing the driving state when the fiber laser device 1 has failed corresponding to 120% or less of the boundary condition for failure occurrence caused by reflected light may be determined to be data effective for reinforcing the learning result.

In Step S210, when it is determined that the state variable representing the driving state of the fiber laser device 1 observed by the state quantity observation unit 11 when a failure has occurred does not exceed the boundary condition for failure occurrence caused by reflected light as obtained from the learning results so far, the result predicted from the learning result that no failure occurs does not match the result that a failure has actually occurred, and hence the machine learning device 100 sets a negative reward (Step S213), and updates the value function (Step S214). As the state variable representing the driving state of the fiber laser device 1 observed by the state quantity observation unit 11 at the time of the occurrence of the failure has a larger deviation from the boundary condition for failure occurrence caused by reflected light as obtained from learning results so far, a larger negative reward may be set because it means that a failure has occurred in a state in which no failure is expected to occur from the learning result so far.

In Step S215 following Step S214, the machine learning device 100 determines whether the fiber laser device 1 is a fiber laser device 1 in which the failure has currently occurred. When determination result is YES in Step S208, it means that the fiber laser device 1 is a fiber laser device 1 in which the failure has currently occurred, and hence the fiber laser device 1 is powered off for repair, and the fiber laser device 1 cannot be accessed by the machine learning device 100. Thus, the flow proceeds to Step S223 from Step S215, and it is determined whether an instruction to continue learning has been issued. When an instruction to continue learning has not been issued, the learning is finished. When an instruction to continue learning has been issued, the flow returns to S201 to continue the learning.

In Step S208, when determination result is NO from the determination data (it is determined that a failure has not occurred in the fiber laser device 1), on the other hand, the machine learning device 100 next determines whether the state variable representing the driving state of the fiber laser device 1 observed by the state quantity observation unit 11 exceeds the boundary condition for failure occurrence caused by reflected light as obtained from the learning results so far (Step S216). The determination that the state variable representing the driving state of the fiber laser device 1 observed by the state quantity observation unit 11 exceeds the boundary condition for failure occurrence caused by reflected light as obtained from the learning results so far means that a failure has not actually occurred even though the state variable exceeds the boundary condition for failure occurrence caused by reflected light as obtained from the learning results so far. The result of failure occurrence predicted from the learning result does not match the result that a failure has not actually occurred, and hence the machine learning device 100 sets a negative reward (Step S217), and updates the value function (Step S214). In the state in which a failure has not occurred, as the state variable representing the driving state of the fiber laser device 1 observed by the state quantity observation unit 11 when exceeding the boundary condition for failure occurrence caused by reflected light as obtained from learning results so far has a larger difference from the boundary condition for failure occurrence caused by reflected light as obtained from learning results so far, it means that a failure has not occurred in the state in which a failure occurs without exception on the basis of the learning results so far, and hence a large negative reward may be set. Note that this situation can occur only in a limitation characteristic test fiber laser device as long as the failure avoidance operation normally operates as described above.

In Step S216, when it is determined that the state variable representing the driving state of the fiber laser device 1 observed by the state quantity observation unit 11 does not exceed the boundary condition for failure occurrence caused by reflected light as obtained from the learning results so far, the flow proceeds to Step S218. Because determination result is NO in Step S208 and the flow proceeds to Step S216, this state in which no failure has occurred in the fiber laser device 1 and the state variable does not exceed the boundary condition for failure occurrence caused by reflected light is extremely normal. In a fiber laser device 1 actually used for laser machining in a manufacturing scene, when the state variable exceeds the failure avoidance critical condition set on the safer side than the boundary condition for failure occurrence caused by reflected light, the driving conditions of the fiber laser device 1 including the light output instruction are changed in order to avoid a failure in the fiber laser device 1. Thus, if the learning progresses and the precision of the boundary condition for failure occurrence caused by reflected light corresponding to the learning result improves, the flow is expected to always go through this path (Step S208→Step S216→Step S218).

In Step S218, the machine learning device 100 determines whether data on the result that the state variable representing the driving state of the fiber laser device 1 does not exceed the boundary condition for failure occurrence caused by reflected light as obtained from the learning results so far and the fiber laser device 1 is not faulty is effective data. When it is determined that the data is effective data, it means that the result predicted from the learning result that no failure occurs matches the result that a failure has not actually occurred, and hence the machine learning device 100 sets a positive reward (Step S219), and updates the value function (Step S214).

In regard to the determination as to whether the data is effective in Step S218, data of a condition which is much apart from the boundary condition for failure occurrence caused by reflected light as obtained from learning results so far and under which no failure is expected to occur is not effective. Thus, when a failure avoidance action for avoiding a failure is taken if the state variable representing the driving state of the fiber laser device 1 is 80% or more of the boundary condition for failure occurrence caused by reflected light (when the state variable representing the driving state of the fiber laser device 1 is originally a state variable for which a failure avoidance action for avoiding a failure should be taken during the execution of the limitation characteristic test), this data may be determined as data effective for reinforcing the learning result.

After the value function is updated in Step S214, in the next Step S215, the machine learning device 100 determines whether the fiber laser device 1 is a fiber laser device 1 in which the failure has currently occurred. When determination result is NO in Step S208 and the flow proceeds to Step S216, no failure has occurred in the fiber laser device 1, and hence the fiber laser device 1 can be accessed by the machine learning device 100. Thus, the machine learning device 100 outputs failure avoidance data updated on the basis of the updated value function to at least the fiber laser device 1 and another fiber laser device 1 that is powered on at that time among the fiber laser devices 1 connected through the communication means 9 (Step S220).

Subsequently, in Step S221, the machine learning device 100 determines whether the execution of the light output instruction on the fiber laser device 1 has been finished. When the execution of the light output instruction has not been finished, the flow returns to Step S206, and the state quantity observation unit 11 continues observing the state quantity of the fiber laser device 1. When the execution of the light output instruction has been finished, on the other hand, the machine learning device 10 further determines whether an instruction to power off the fiber laser device 1 has been issued (Step S222). When an instruction to power off the fiber laser device 1 has not been issued, the flow returns to Step S205 to wait for a new light output instruction issued to the fiber laser device 1. When an instruction to power off the fiber laser device 1 has been issued, on the other hand, the flow proceeds to Step S223 to determine whether an instruction to continue learning has been issued. When an instruction to continue learning has not been issued, the learning is finished. When an instruction to continue learning has been issued, the flow returns to Step S201, and the learning is continued.

Note that, when it is determined in Step S218 that the data on the result that the state variable representing the driving state of the fiber laser device 1 does not exceed the boundary condition for failure occurrence caused by reflected light as obtained from the learning results so far and the fiber laser device is not faulty is not effective data, the flow proceeds to Step S221.

By repeating Steps S201 to S223 described above, the learning unit 131 repeatedly updates the value function to learn the boundary condition for failure occurrence caused by reflected light.

Note that the above descriptions of Steps S201 to S223 are descriptions of an operation example of one of a plurality of fiber laser devices 1 connected to the machine learning device 100 through the communication means 9. When a plurality of fiber laser devices 1 are connected to the machine learning device 100 through the communication means 9 and are simultaneously powered on, the operations of Steps S201 to S223 are simultaneously performed on the fiber laser devices 1. Thus, the learning unit 131 can include a plurality of value functions as needed.

In view of an example of the operation described above, also in the case of reinforcement learning, some limitation characteristic test fiber laser devices are needed in order to progress the learning similarly to the case of supervised learning. Reinforcement learning may be started from the state in which the learned knowledge is accumulated to a certain degree by setting the state in which prior learning has been performed by supervised learning as the initial state.

In reinforcement learning, not only determination and classification but also actions are learned to learn a method for learning appropriate actions in consideration of the mutual effects of the actions on environments, that is, a learning method for maximizing rewards obtained in the future. In this embodiment, for example, as a result of outputting the failure avoidance data, actions that affect the future can be acquired in a manner that the fiber laser device can or cannot avoid a failure due to reflected light.

The value function update unit 19 can perform reinforcement learning by using so-called Q-learning. The method of reinforcement learning is not limited to Q-learning. Q-learning is a method for learning a value $Q(s,a)$ of selecting an action a under a given environmental state s. In the given state s, an action a having the highest value $Q(s,a)$ is selected as an optimal action.

In the beginning, however, the correct value of the value $Q(s,a)$ for a combination of the state s and the action a is completely unknown. Thus, various actions a are selected under a given state s, and rewards are given to the selected actions a. In this manner, a better action is selected, that is, the correct value $Q(s,a)$ is learned.

To maximize the sum of rewards obtained in the future as a result of the actions, trials are made to finally achieve $Q(s,a)=E[\Sigma(\gamma_t)r_t]$, where E[ ] represents the expected value, t is time, γ is a parameter called discount factor described later, $r_t$ is a reward at the time t, and Σ is the sum at the time t. The expected value in the equation is taken when the state changes in accordance with the optimal action, and is unknown and learned by exploration. Such an update equation of the value $Q(s,a)$ can be expressed by, for example, the following Expression (2). Specifically, the value function update unit 19 updates the value function $Q(s_t,a_t)$ by using the following Expression (2).

$$Q(s_t, a_t) \leftarrow Q(s_t, a_t) + \alpha\left(r_{t+1} + \gamma \max_a Q(s_{t+1}, a) - Q(s_t, a_t)\right) \quad (2)$$

where $s_t$ represents the environmental state at the time t, and $a_t$ represents an action at the time t. The state changes to $s_{t+1}$ by the action $a_t$. $r_{t+1}$ represents a reward obtained by the change in the state. The term with max obtained by multiplying a Q value when selecting an action a having the highest Q value known at that time under the state $s_{t+1}$ by γ. γ is a parameter of $0 \leq \gamma \leq 1$, and is called "discount factor". α is a learning coefficient in the range of $0 \leq \alpha \leq 1$.

The above-mentioned Expression (2) indicates a method for updating the evaluated value $Q(s_t,a_t)$ of the action at in the state $s_t$ on the basis of the reward $r_{t+1}$ returned as a result of the trial $a_t$. Specifically, Expression (2) indicates that the evaluated value $Q(s_t,a_t)$ of the action a in the state s is increased when the sum of the reward $r_{t+1}$ and the evaluated value $Q(s_{t+1},\max a_{t+1})$ of the best action max a in the state subsequent to the action a is larger than $Q(s_t,a_t)$, and otherwise $Q(s_t,a_t)$ is decreased. In other words, the value of a given action in a given state is approximated to the value of the best action in the subsequent state derived from the reward immediately returned as a result and its action.

The way of expression of $Q(s,a)$ on a computer includes a method of holding the values of all state action pairs (s,a) in an action-value table and a method of preparing a function for approximating $Q(s,a)$. In the latter method, the above-mentioned Equation (2) can be implemented by adjusting parameters of an approximation function by a method such as stochastic gradient descent. Note that a neural network can be used as the approximation function. The neural network is constructed by an arithmetic device and a memory simulating a neuron model.

As described above, neural networks can be used as a learning algorithm of supervised learning and an approximation algorithm of the value function in reinforcement learning, and hence it is preferred that the machine learning device 100 have neural networks.

Figure 5:
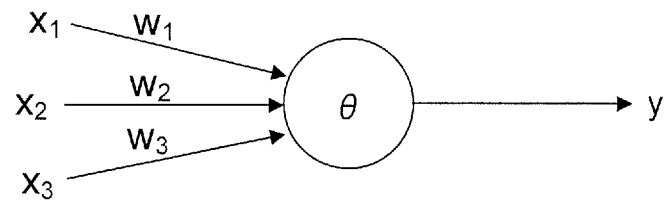
FIG. 5 is a diagram schematically illustrating a neuron model.
Figure 6:
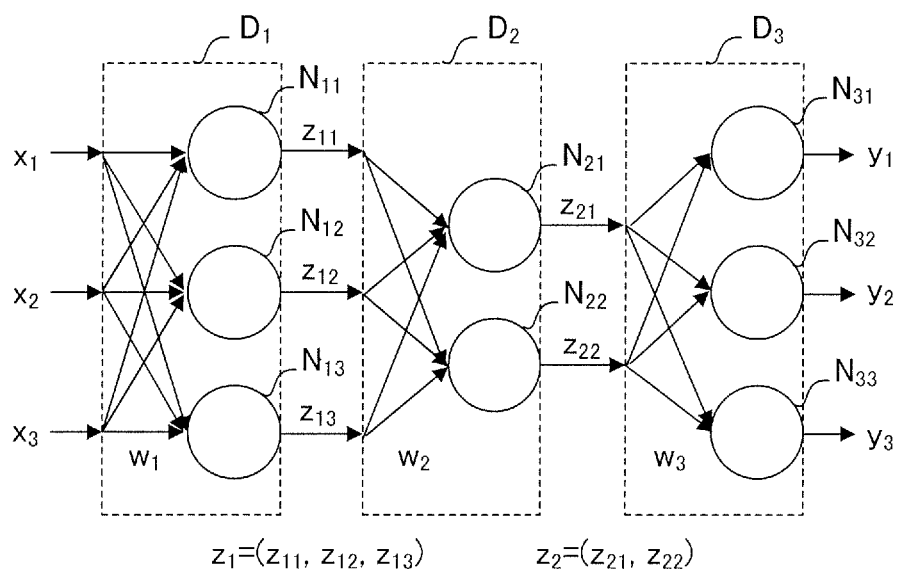
FIG. 6 is a diagram schematically illustrating a three-layer neural network constructed by combining neurons illustrated in FIG. 5.

FIG. 5 is a diagram schematically illustrating a neuron model. FIG. 6 is a diagram schematically illustrating a three-layer neural network constructed by combining neurons illustrated in FIG. 5.

A neural network is constructed by an arithmetic device and a memory simulating the neuron model illustrated in FIG. 5. A neuron outputs an output (result) y for a plurality of inputs x. Each input x ($x_1$ to $x_3$) is multiplied with a weight w ($w_1$ to $w_3$) corresponding to the input x, and the neuron outputs a result y expressed by the following Equation (3). Note that the inputs x, the results y, and the weights w are all vectors.

$$y = f_k(\Sigma_{i=1}^{n} x_i w_i - \theta) \qquad (3)$$

where $\theta$ is a bias and $f_k$ is an activation function.

As illustrated in FIG. 6, a plurality of inputs x ($x_1$ to $x_3$) are input from the left side of the neural network, and results y ($y_1$ to $y_3$) are output from the right side. The inputs $x_1$ to $x_3$ are input to each of three neurons $N_{11}$ to $N_{13}$ after being multiplied with corresponding weights. The weights to be multiplied with the inputs are correctively represented as $w_1$.

The neurons $N_{11}$ to $N_{13}$ output $z_{11}$ to $z_{13}$, respectively. In FIG. 6, $z_{11}$ to $z_{13}$ are collectively represented as a feature vector $z_1$, and can be regarded as a vector obtained by extracting a feature amount of the input vector. The feature vector $z_1$ is a feature vector between the weight $w_1$ and the weight $w_2$. $z_{11}$ to $z_{13}$ are input to each of two neurons $N_{21}$ and $N_{22}$ after being multiplied with corresponding weights. The weights to be multiplied with the feature vectors are correctively represented as $w_2$. The neurons $N_{21}$ and $N_{22}$ output $z_{21}$ and $z_{22}$, respectively. In FIG. 6, $z_{21}$ and $z_{22}$ are collectively represented as a feature vector $z_2$. The feature vector $z_2$ is a feature vector between the weight $w_2$ and the weight $w_3$. $z_{21}$ and $z_{22}$ are input to each of three neurons $N_{31}$ to $N_{33}$ after being multiplied with corresponding weights. The weights to be multiplied with the feature vectors are collectively represented as $w_3$.

Finally, the neurons $N_{31}$ to $N_{33}$ output results $y_1$ to $y_3$, respectively. The operation of the neural network includes a learning mode and a value predictive mode. In the learning mode, a learning data set is used to learn the weight w, and in the predictive mode, the resultant parameter is used to determine the action of output of at least one of failure avoidance data including information for avoiding a failure caused by reflected light and failure occurrence boundary condition data. Online learning in which at least one of failure avoidance data including information for avoiding a failure caused by reflected light and failure occurrence boundary condition data is actually output in the predictive mode and the obtained data is immediately learned and reflected on the next action and batch learning in which collective learning is performed by using a data group collected in advance and learning is performed with the same parameters in a detection mode can be performed. The learning mode may be interposed every time a certain amount of data is accumulated.

The weights $w_1$ to $w_3$ can be learned by backpropagation. Error information is input from the right side and flows to the left side. The backpropagation is a technique for adjusting (learning) the respective weights for the neurons so as to reduce a difference between the output y obtained when the input x is input and the true output y (teacher).

The number of intermediate layers (hidden layers) in the neural network in FIG. 6 is one, but may be two or more. The case where the number of intermediate layers is two or more is called "deep learning".

While the learning methods of supervised learning and reinforcement learning have been briefly described, the machine learning method applied to the present invention is not limited to these techniques, and various kinds of techniques that can be implemented by using a machine learning device, such as "supervised learning", "unsupervised learning", "semi-supervised learning", and "reinforcement learning", can be applied.

Third Embodiment

Figure 7:
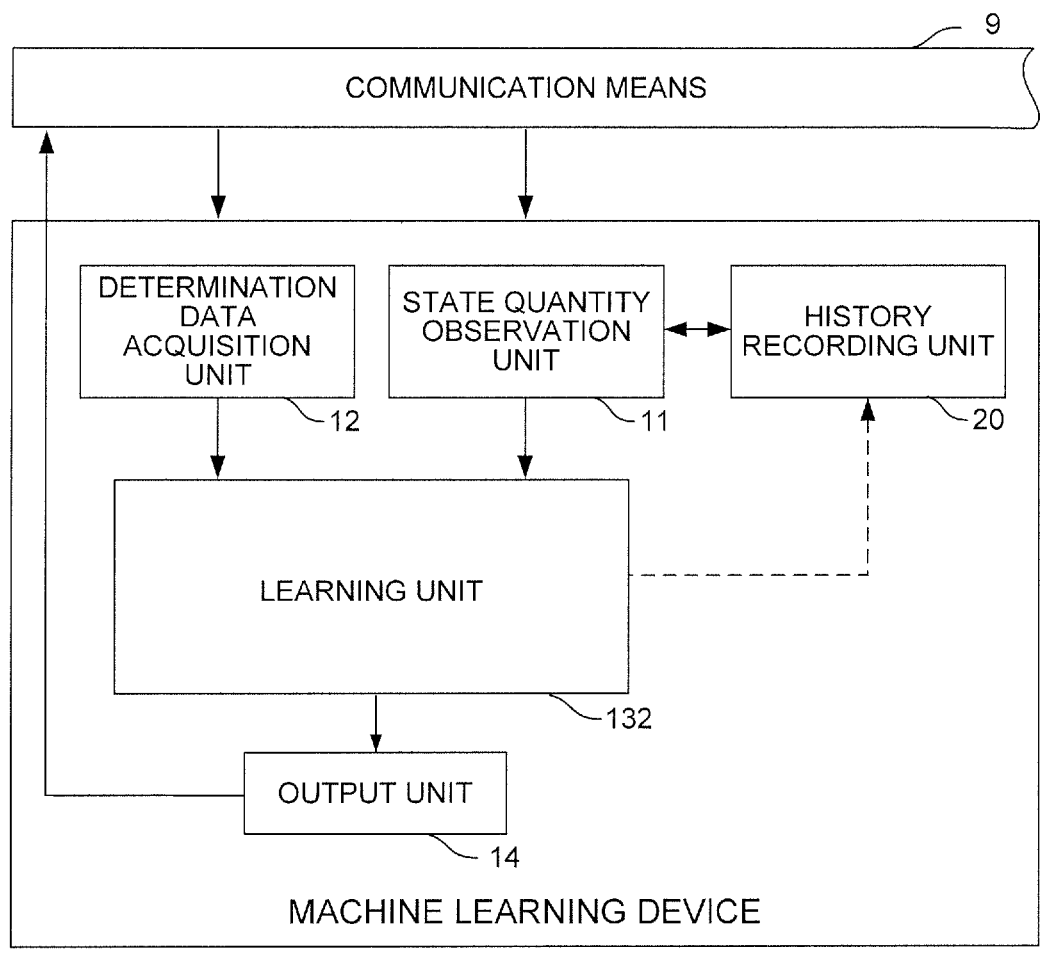
FIG. 7 is a block diagram illustrating a conceptual configuration of a machine learning device according to a third embodiment of the present invention.

FIG. 7 is a block diagram illustrating a conceptual configuration of a machine learning device 200 according to a third embodiment of the present invention.

The machine learning device 200 in this embodiment is different from the machine learning devices 10 and 100 illustrated in FIG. 1 and FIG. 3 in that the machine learning device 200 further includes a history recording unit 20.

The machine learning device 200 records, for each fiber laser device 1 connected through the communication means 9 via the control unit 8, history data on the state quantity of the fiber laser device 1 observed by the state quantity observation unit 11 in the history recording unit 20 as a state quantity history. The learning unit 132 uses the state variables of the individual fiber laser devices 1 including the state quantity histories of the individual fiber laser devices 1 recorded in the history recording unit 20 and determination data and associates the state quantity representing the driving state including the state quantity history with a failure occurrence situation to learn state quantity history dependency of the boundary condition for failure occurrence caused by reflected light in addition to the boundary condition for failure occurrence caused by reflected light in the fiber laser device 1. The machine learning device 200 learns the case where the boundary condition for failure occurrence caused by reflected light is influenced by the history, and hence, for example, if there is a tendency that the level of the boundary condition for failure occurrence caused by reflected light decreases so that a failure is more likely to occur, with increase of an effective cumulative driving time and/or increases of cumulative energy of reflected light of a given energy level or more, the machine learning device 200 can refer to the learning results to add the histories, thereby suppressing the occurrence of a problem in that the probability of the occurrence of a failure by reflected light increases.

However, if every history data is recorded, the recorded data volume of history data on the state quantity of one fiber laser device 1 increases along with time, and hence the state quantity that has a predetermined level or more of influence on the boundary condition for failure occurrence caused by reflected light may be selected on the basis of the learning result of the state quantity history dependency of the boundary condition for failure occurrence caused by reflected light in the fiber laser device 1, and only a history of the selected state quantity may be recorded in the history recording unit 20 while avoiding recording history data that less influences the state quantity history dependency of the boundary condition for failure occurrence caused by reflected light.

The machine learning device 200 may instruct the control unit in the fiber laser device 1 to drive the fiber laser device 1 under predetermined driving conditions, which are driving conditions determined in advance, in accordance with a predetermined schedule, and record the state quantity of the fiber laser device 1 obtained each time the fiber laser device 1 is driven under the predetermined driving conditions in the history recording unit 20 as the state quantity history of the fiber laser device 1. The observation result of the state quantity of the fiber laser device 1 obtained when the fiber laser device 1 is regularly driven under the predetermined same driving condition can be recorded as a transition of the state quantity of the fiber laser device 1 and used as history data, and hence how the state quantity of the fiber laser device 1 can be easily grasped by the history. Consequently, even if there is no other history data, the state quantity history dependency of the boundary condition for failure occurrence caused by reflected light can be learned on the basis of small history data of the observation result of the state quantity of the fiber laser device 1 obtained when the fiber laser device 1 is regularly driven under the same driving condition. As the learning progresses, it is considered that the machine learning device 200 can refer to the learning results to correct the boundary condition for failure occurrence caused by reflected light on the basis of the observation result of the state quantity of the fiber laser device 1 obtained when the fiber laser device 1 is driven under the same driving condition, thereby determining a more accurate boundary condition for failure occurrence caused by reflected light.

When a new fiber laser device 1 is connected to the communication means 9 to which the machine learning device 200 is connected, the machine learning device 200 instructs a control unit in the newly-connected fiber laser device 1 to drive the fiber laser device 1 under predetermined initial driving conditions, which are initial driving conditions determined in advance, and records the state quantity of the fiber laser device 1 obtained when the fiber laser device 1 is driven under the predetermined initial driving conditions in the history recording unit 20 as a state quantity history of the fiber laser device 1. The recorded state quantity history may be regarded as corresponding to the first driving under the predetermined driving conditions in the above-mentioned predetermined schedule.

For the fiber laser device 1 newly connected to the machine learning device 200, information on the individual difference of the fiber laser device 1, such as a detection result output from each reflected light detection unit 7 with respect to the driving under the predetermined initial driving condition including the state of the workpiece, can be acquired to progress the learning in consideration of the individual difference information. As the learning progresses, the machine learning device 200 refers to the learning result and outputs the boundary condition for failure occurrence caused by reflected light in the fiber laser device 1 in consideration of the individual difference of the boundary condition for failure occurrence caused by reflected light on the basis of the state quantity for the driving under the predetermined initial driving condition. Consequently, the occurrence of a failure by reflected light due to the individual difference can be prevented.

Figure 8:
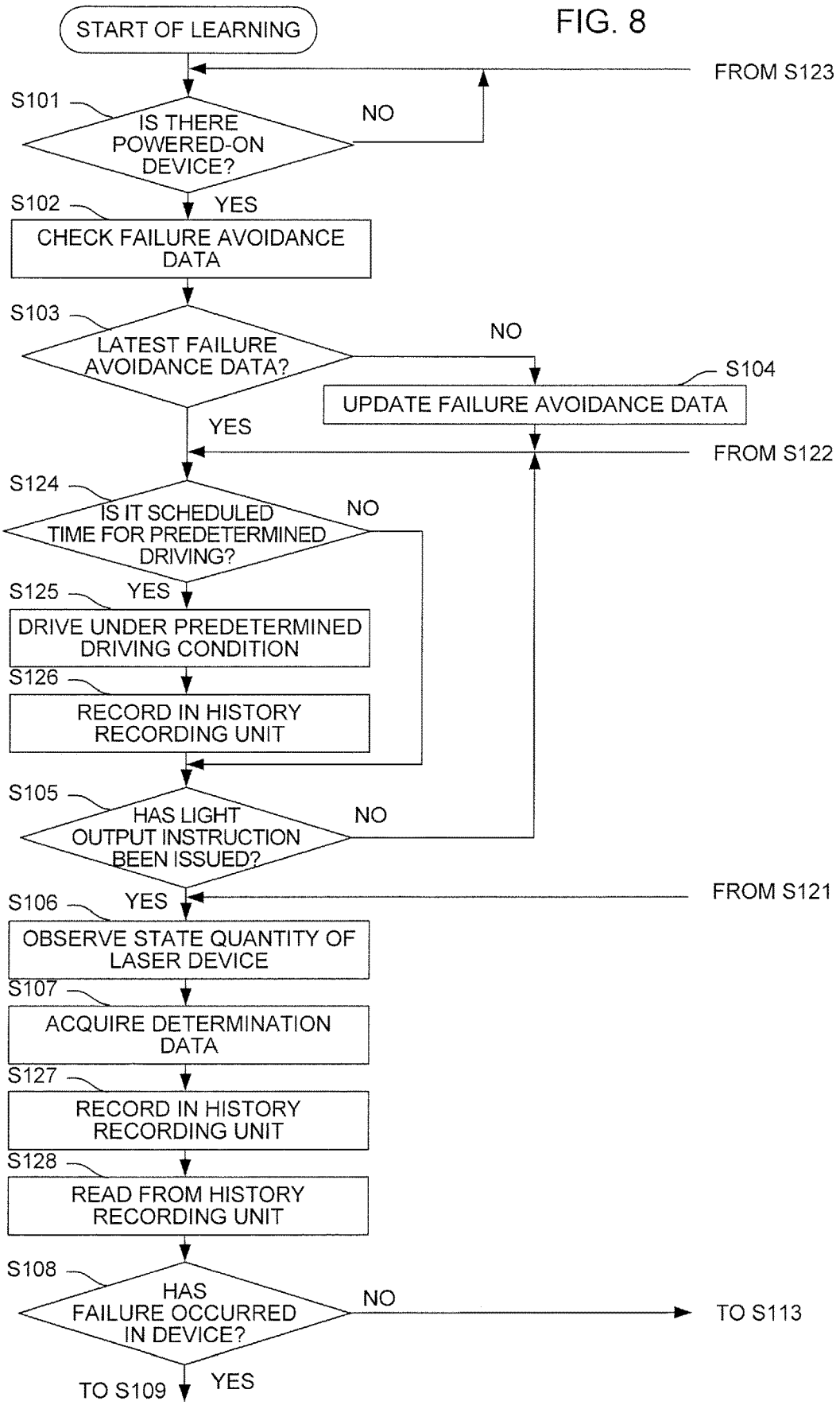
FIG. 8 is a part of a flowchart illustrating an example of operation of the machine learning device illustrated in FIG. 7.

FIG. 8 is a part of a flowchart illustrating an example of operation of the machine learning device in this embodiment. Only Steps S124 to S128 are added between Steps S103 to S108 in the flowcharts of FIG. 2A and FIG. 2B, and hence FIG. 8 illustrates the flowchart corresponding to the added steps.

History data on the state quantity of the fiber laser device 1 observed by the state quantity observation unit 11 is recorded in the history recording unit 20 as a state quantity history. The learning unit 132 uses the state variables of the individual fiber laser devices 1 including the state quantity histories of the individual fiber laser devices 1 recorded in the history recording unit 20 and determination data and associates the state quantity representing the driving state including the state quantity history with a failure occurrence situation to learn state quantity history dependency of the boundary condition for failure occurrence caused by reflected light in addition to the boundary condition for failure occurrence caused by reflected light in the fiber laser device 1. The part corresponding to this processing is Step S127 and Step S128.

The machine learning device 200 records the history data on the state quantity of the fiber laser device 1 observed by the state quantity observation unit 11 in the history recording unit 20 as a state quantity history (Step S127), reads out the state quantity histories of the individual fiber laser devices 1 recorded in the history recording unit 20 (Step S128), and associates the state quantity representing the driving state including the state quantity history with a failure occurrence situation to learn state quantity history dependency of the boundary condition for failure occurrence caused by reflected light in addition to the boundary condition for failure occurrence caused by reflected light in the fiber laser device 1. In Step S127, in order to suppress the increase in recorded information volume, as described above, only the state quantity that has a predetermined level or more of influence on the boundary condition for failure occurrence caused by reflected light may be selected and recorded on the basis of the learning result of the state quantity history dependency of the boundary condition for failure occurrence caused by reflected light.

The fiber laser device 1 is driven under predetermined driving conditions in accordance with a predetermined schedule, and the machine learning device 200 records the state quantity of the fiber laser device 1 obtained each time the fiber laser device 1 is driven under the predetermined driving conditions in the history recording unit 20 as a state quantity history of the fiber laser device 1. The part corresponding to this processing is Step S124 to Step S126. While checking the predetermined schedule, it is determined whether it is a scheduled time to obtain the state quantity when the fiber laser device 1 is driven under the predetermined driving condition (Step S124). When it is determined that it is a scheduled time for predetermined driving, the fiber laser device 1 is driven under the predetermined driving condition (Step S125), and the state quantity at the time of the driving, for example, light output characteristics of the laser oscillator 2 are recorded in the history recording unit 20 (Step S126). In the case where only the state quantity of the fiber laser device 1 when the fiber laser device 1 is driven under the predetermined driving condition in accordance with the predetermined schedule is recorded in the history recording unit 20 as history data of the state quantity, it is unnecessary to record the state quantity of the fiber laser device 1 in the history recording unit 20 in Step S127.

Figure 9:
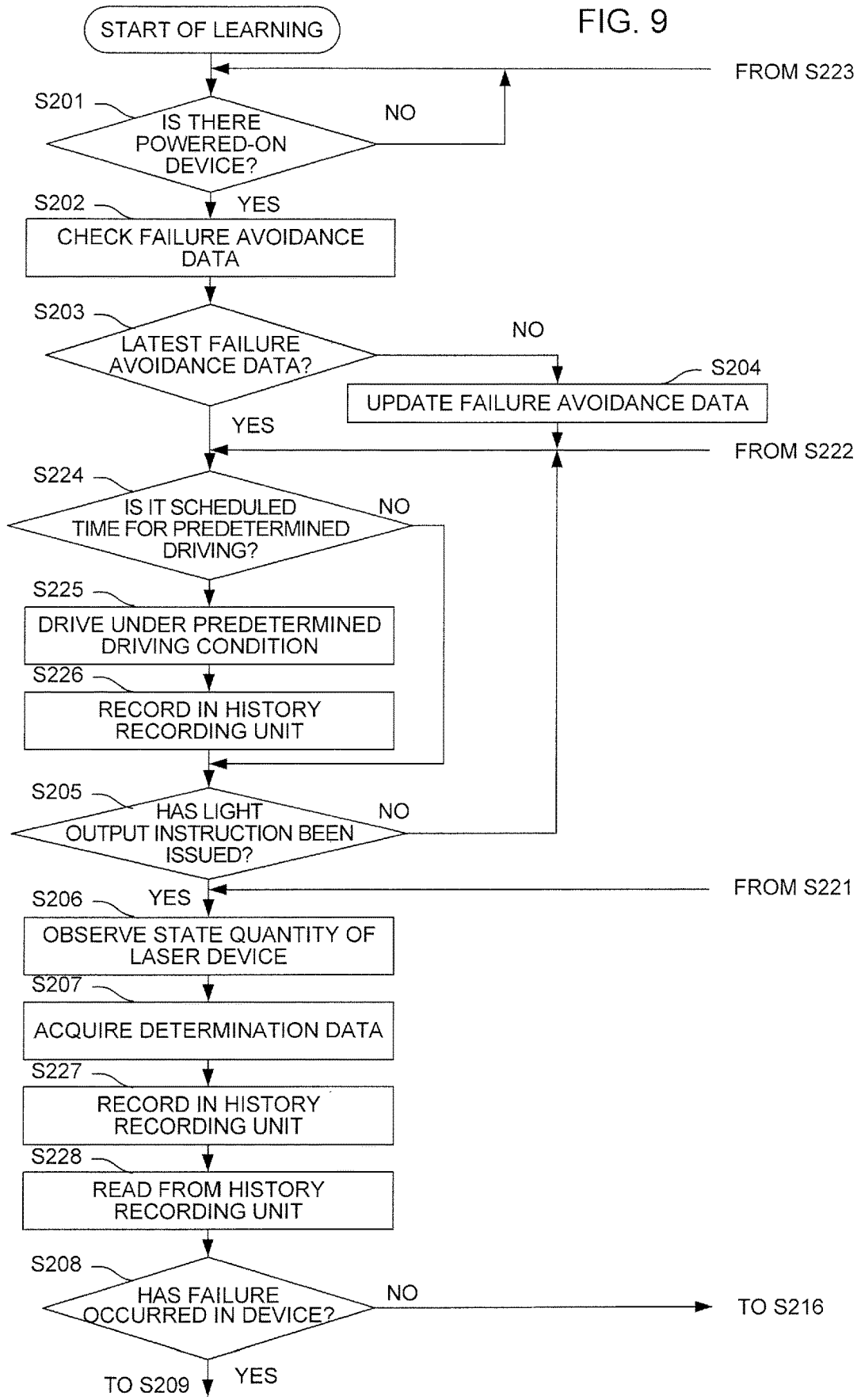
FIG. 9 is a part of the flowchart illustrating an example of the operation of the machine learning device illustrated in FIG. 7.

FIG. 9 is a part of a flowchart illustrating an example of operation of the machine learning device 200 in this embodiment.

Steps S224 to S228 are added between Steps S203 to S208 in the flowcharts in FIG. 4A and FIG. 4B, but the flowchart in FIG. 9 is the same as the flowchart in FIG. 8 except for the step numbers, and hence descriptions thereof are omitted.

Fourth Embodiment

FIG. 10 and FIG. 11A to FIG. 11D illustrate examples of limitation characteristic test condition program in which the machine learning device 10, 100, or 200 according to a fourth embodiment of the present invention predicts, for at least one limitation characteristic test fiber laser device, the boundary condition for failure occurrence caused by reflected light in the limitation characteristic test fiber laser device on the basis of the learning result by the learning unit 13, 131, or 132, and the predicted result is output from the output unit 14 as the failure avoidance data.

As the learning of the boundary condition for failure occurrence caused by reflected light by the above-mentioned method progresses, the failure occurrence boundary condition is roughly known, and hence by using the learning result, the learning precision of the failure occurrence boundary condition can be increased more efficiently, and the change in failure occurrence boundary condition when the manufacturing condition data is changed as described above can be grasped. For example, a limitation characteristic test condition program in which the boundary condition for failure occurrence caused by reflected light is predicted for a limitation characteristic test fiber laser device, and a test result effective for determining the boundary condition for failure occurrence caused by reflected light is acquired as much as possible before a failure occurs may be provided. By executing a test in accordance with a limitation characteristic test condition program with which many pieces of test data effective for grasping the boundary condition for failure occurrence caused by reflected light can be acquired, the number of fiber laser devices 1 to be broken by a limitation characteristic test in order to acquire necessary test data can be reduced.

What kind of limitation characteristic test condition programs are specifically conceivable is described below.

Figure 10:
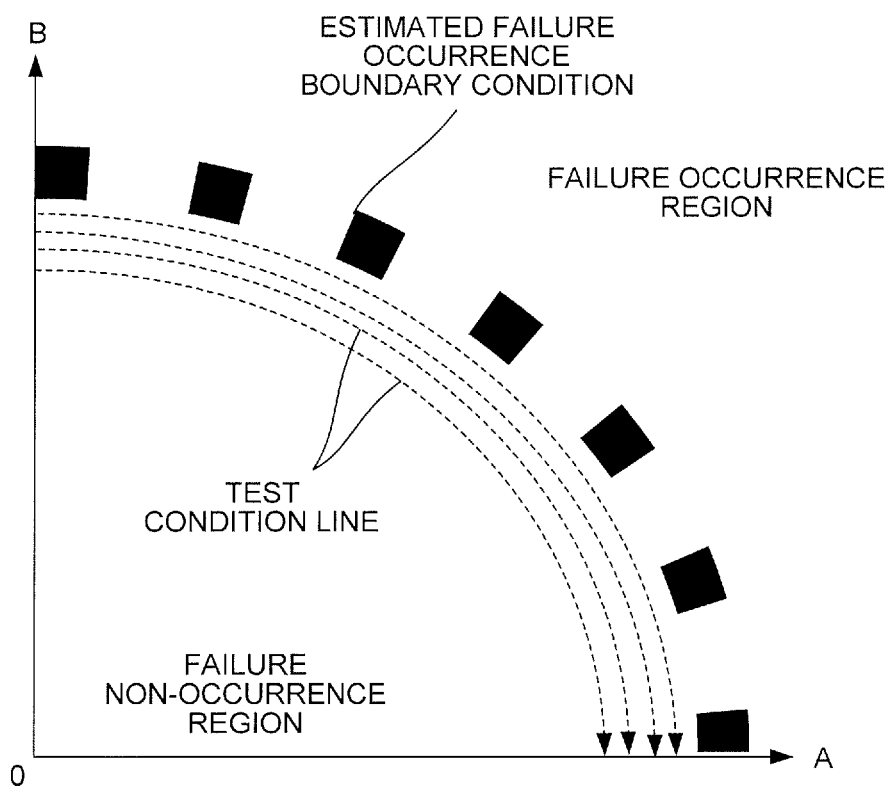
FIG. 10 illustrates an example of a limitation characteristic test condition program output from a machine learning device according to a fourth embodiment of the present invention.

The boundary condition for failure occurrence caused by reflected light is considered to include many parameters, but for simple description, it is supposed that the boundary condition for failure occurrence caused by reflected light is determined by two parameters of A and B. When the failure occurrence boundary condition as indicated by thick broken lines in FIG. 10 is roughly predicted or estimated by learning so far, a test is executed while changing a test condition of a combination of the parameter A and the parameter B as indicated by thin broken lines from a curve close to the origin in the direction of arrows. In this manner, many pieces of test data effective for grasping the boundary condition for failure occurrence caused by reflected light can be acquired.

Note that the parameters taken as the test condition naturally include optical energy of reflected light and the waveform of reflected light, but it is difficult to control the energy or waveform of light reflected by the workpiece, and hence laser light emitted from another laser device may be caused to enter in an opposite direction from an output end of the optical fiber in the fiber laser device 1, and a test may be executed with pseudo reflected light having the controlled energy or waveform. The location where the laser light is caused to enter may be a core of the output end of the optical fiber or a clad so that the test condition is changed.

When a failure by reflected light has occurred while a limitation characteristic test is executed in accordance with the limitation characteristic test condition program, the learning unit 13, 131, or 132 may extract the state quantity of the fiber laser device 1 including the reflected light detection result detected by the reflected light detection unit 7 or a change in the state quantity for a test conducted under test conditions before the failure by reflected light occurs, construct a learning model for exploring for features of the extracted state quantity or the extracted change in the state quantity, and learn a precursor of failure caused by reflected light while the limitation characteristic test is executed in accordance with the limitation characteristic test condition program. In this case, if a test is conducted while a plurality of parameters are changed, it may be difficult to grasp the features of the change in the state quantity before a failure by reflected light occurs. Thus, for example, it is desired to conduct a test while changing only one parameter (parameter A in FIG. 11A to FIG. 11D) like the limitation characteristic test condition program illustrated in FIG. 11A to FIG. 11D. By learning a model for regularity or distribution for only data on the dependency of the state quantity of the fiber laser device 1 or the change in the state quantity on the parameter A before a failure by reflected light occurs, the learning becomes relatively easy, and the possibility that a precursor of failure occurrence can be extracted increases. For example, the following precursor is explored. Specifically, when the parameter A is increased at a constant speed, a change in the intensity of reflected light detected by the reflected light detection unit 7 or the intensity of output light detected by the output light detection unit 6, which is a state quantity of the fiber laser device 1 that has changed in proportion to the parameter A will deviate from the proportional relation so far because the temperature of a site to fail increases and the physical property of the site changes.

Figure 11A:
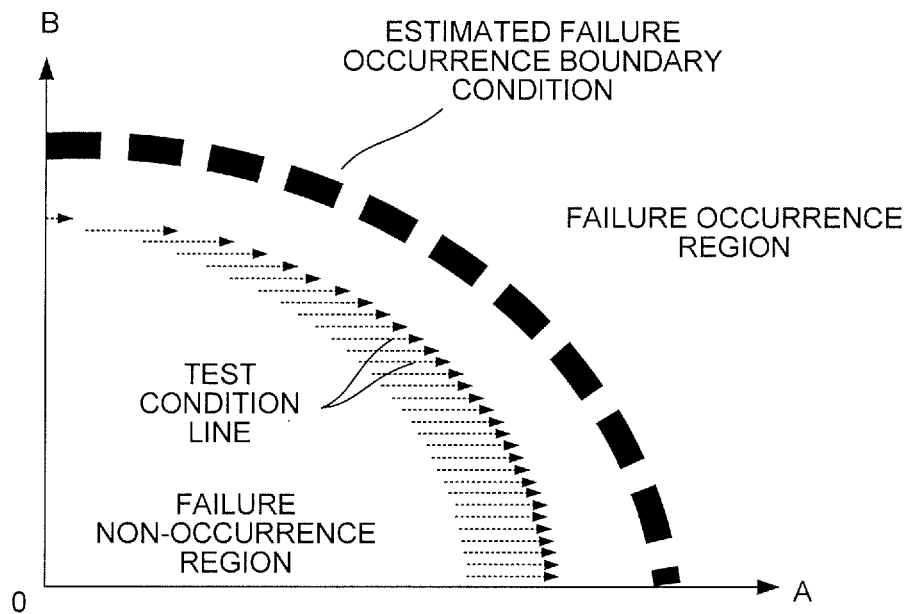
FIG. 11A to FIG. 11D illustrate another example of the limitation characteristic test condition program output from the machine learning device according to the fourth embodiment of the present invention.
Figure 11B:
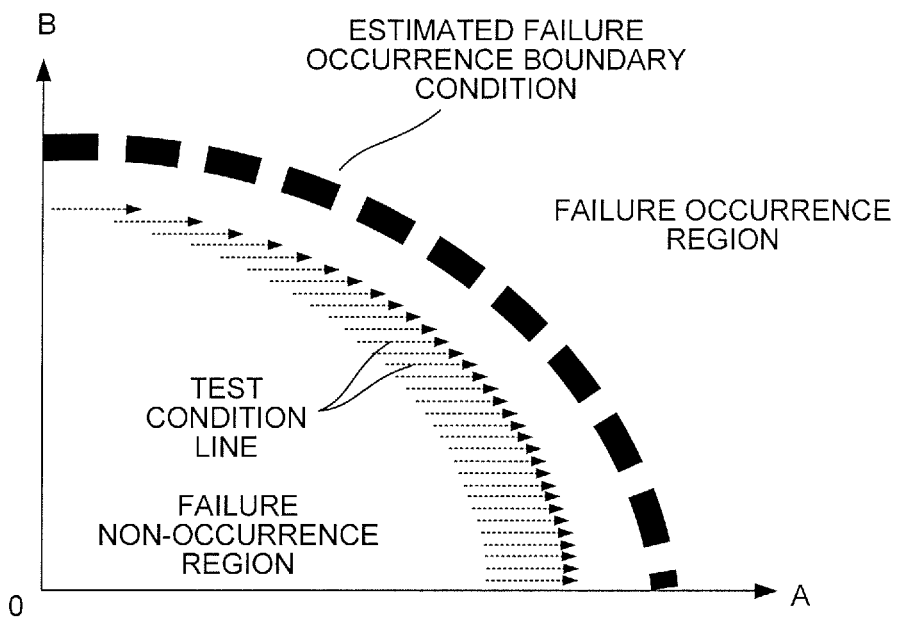
Figure 11C:
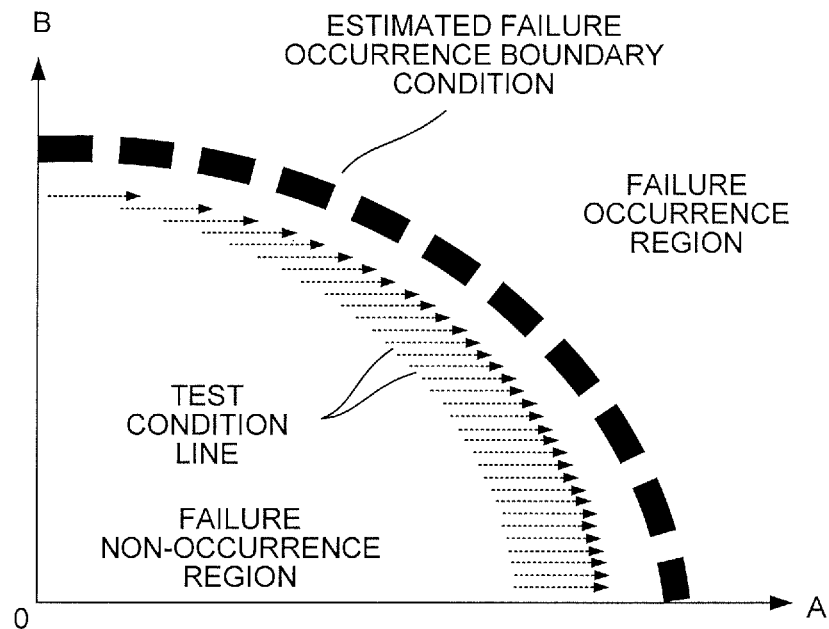
Figure 11D:
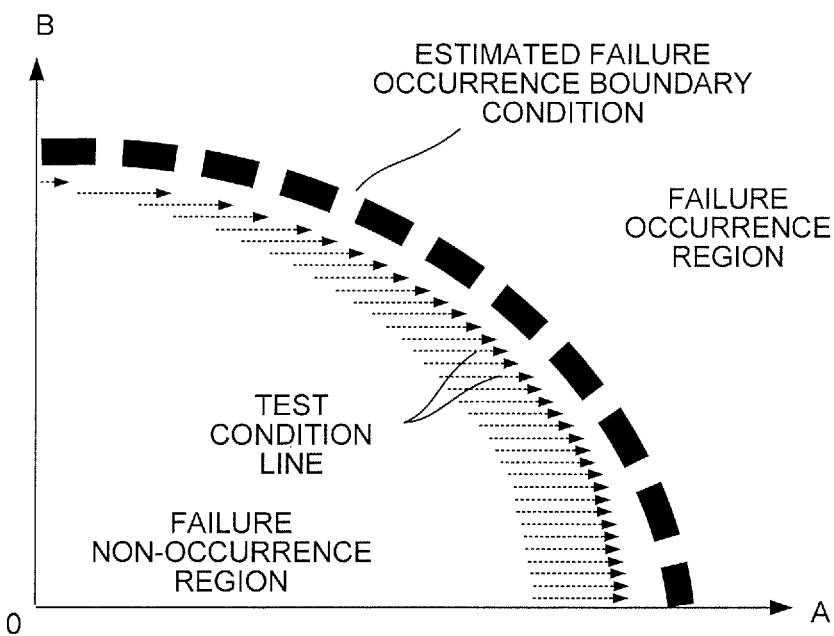

In the limitation characteristic test condition programs in FIG. 11A to FIG. 11D, the following is desired. A test is conducted while changing the test condition of the combination of the parameter A and the parameter B as indicated by thin broken lines in FIG. 11A from the upper side in the direction of arrows by changing the parameter A. After the testing program illustrated in FIG. 11A is finished, the testing program illustrated in FIG. 11B is conducted. After the testing program illustrated in FIG. 11B is finished, the testing program illustrated in FIG. 11C is conducted. After the testing program illustrated in FIG. 11C is finished, the testing program illustrated in FIG. 11D is conducted. In this manner, the tests are conducted under conditions closer to the estimated failure occurrence boundary conditions.

When a failure by reflected light occurs in a process of progressing the limitation characteristic tests while sequentially slightly changing the test conditions in accordance with the limitation characteristic test condition programs illustrated in FIG. 11A to FIG. 11D, the state quantity of the fiber laser device 1 including the reflected light detection result detected by the reflected light detection unit 7 obtained by tests under earlier test conditions including the previous test conditions or a change in the state quantity is extracted. Then, the features thereof are explored to learn a precursor of failure occurrence, and on the basis of the learning result related to the precursor, when a precursor of failure occurrence by reflected light is observed in the state quantity of the fiber laser device 1 including the reflected light detection result detected by the reflected light detection unit 7 or a change in the state quantity while a limitation characteristic test is executed in accordance with the limitation characteristic test condition program, the test according to the limitation characteristic test condition program is suspended or the limitation characteristic test condition program is changed. In this manner, the boundary condition for failure occurrence caused by reflected light can be grasped in a limitation characteristic test fiber laser device without causing a failure by reflected light, and the number of fiber laser devices 1 to be broken by the limitation characteristic test can be significantly reduced. When the precision of the learning result improves such that the precursor of failure by reflected light is reliably grasped, the boundary condition for failure occurrence caused by reflected light can be determined by using a fiber laser device 1 that is not a limitation characteristic test fiber laser device.

As described above, on the basis of the learning results including at least a learning result of the boundary condition for failure occurrence caused by reflected light, the output unit 14 in the machine learning device 10, 100, or 200 may output a failure avoidance critical condition for the state quantity of each fiber laser device 1 including the reflected light detection result detected by the reflected light detection unit 7, under which a driving condition of the fiber laser device 1 needs to be changed in order to avoid a failure by reflected light (for example, as described above, a condition corresponding to 80% of the failure occurrence boundary condition), and a failure avoidance driving condition that is the driving condition of the fiber laser device 1 for avoiding a failure by reflected light when the failure avoidance critical condition is reached, to the control unit in each fiber laser device 1 connected through the communication means 9 as failure avoidance data.

The failure avoidance driving condition can also be learned by the machine learning device 100 by feeding back the result of the failure avoidance driving condition obtained when the state quantity has reached the failure avoidance critical condition in each fiber laser device 1 in accordance with the failure avoidance driving condition output to the control unit 8 in each fiber laser device 1. After the learning of the boundary condition for failure occurrence caused by reflected light has progressed, if a failure occurs due to reflected light, it is considered that the failure avoidance driving condition is inappropriate. Thus, as a result of the failure avoidance driving condition, when the failure can be avoided, a positive reward is set, and when the failure cannot be avoided, a negative reward is set, and further, a positive reward is set when the machining defect is within a predetermined range while a negative reward is set when the machining defect exceeds the predetermined range, and a positive reward is set when a time loss by failure avoidance driving within a predetermined range while a negative reward is set when the time loss by failure avoidance driving exceeds the predetermined range. In this manner, the failure avoidance driving condition can be learned by updating the value function of the failure avoidance driving condition.

On the basis of the learning result of the boundary conditions for failure occurrence caused by reflected light including the manufacturing condition dependency and the state quantity history dependency, the failure avoidance critical condition is output to the control unit 8 in each fiber laser device 1 and the failure avoidance driving condition is output to the control unit 8 in each fiber laser device 1 as failure avoidance data. Accordingly, when the fiber laser device 1 reaches the failure avoidance critical condition, the driving conditions instructed in advance can be shifted to the failure avoidance driving condition, and hence the occurrence of a failure by reflected light can be avoided and the fiber laser device 1 can be driven under driving conditions that less adversely affect the machining results and the time required for processing. Specifically, the simplest failure avoidance method is to stop laser oscillation when the fiber laser device 1 reaches the failure avoidance critical condition, but there are problems in that a time loss occurs until the restart of laser oscillation and a machining defect occurs during laser machining. Thus, a method in which the laser light output is stopped or reduced only for an extremely short period when the fiber laser device 1 reaches the failure avoidance critical condition can be considered, so that the laser light output is immediately automatically resumed to its original laser light output level. For example, by optimizing the time period during which the laser light output is stopped or reduced (extremely short period as described above), the adverse effect on the machining results and the time required for machining can be minimized while avoiding the occurrence of a failure by reflected light.

Note that the failure avoidance driving condition may include, in addition to the laser light output condition corresponding to the light output instruction, a relative position condition between the machining head and the workpiece, a relative position condition between the focal point of laser light emitted from the machining head and the workpiece, an F-number condition of a condensing optical system of the machining head, and a beam profile condition of laser beams emitted from the machining head. Instead of reducing the laser light output for avoiding the occurrence of a failure by reflected light or at the same time as reducing the laser light output, other driving conditions may be changed to minimize adverse effects on machining results and the time required for machining.

For example, it is conceivable to minimize the occurrence of machining defects by reducing the speed of the machining head with respect to the workpiece in synchronization with the reduction in laser light output.

Fifth Embodiment

FIG. 12A to FIG. 12C and FIG. 13A to FIG. 13C illustrate an example of a learning process of the machine learning device 10, 100, or 200 according to a fifth embodiment of the present invention. For learning a boundary condition for failure occurrence caused by reflected light, the machine learning device 10, 100, or 200 in this embodiment learns the failure occurrence boundary condition by a simplified method in which, at least in the initial stage of learning, for at least one site to fail, at least an upper limit temperature of the site to fail, a heat capacity of the site to fail, and a thermal resistance from the site to fail to a heat sink are determined.

It is considered that the cause of a failure by reflected light is mainly a temperature increase of a faulty site due to heat. When a heat generating portion is a part of an optical fiber, the part has a small heat capacity, and hence it is considered that a failure occurs because the temperature increases in an extremely short period. If it is supposed that a failure by reflected light occurs when a site to fail is damaged due to an increase in temperature of the site to fail, energy to be accumulated in the site to fail by the reflected light is a value obtained by adding heat calorific values H(W) caused by reflected light entering the site to fail (which can be observed as a value proportional to a result detected by a corresponding reflected light detection unit) in a time-series manner. The temperature increase $\Delta T(K)$ is determined by dividing the energy Q(J) accumulated in the site to fail by the heat capacity C(J/K) of the site to fail. On the other hand, the energy Q accumulated in the site to fail flows out of the site to fail at a time rate of a value $\Delta T/R(W)$ obtained by dividing the temperature increase $\Delta T(K)$ of the site by the thermal resistance R(K/W) from the site to fail to the heat sink. In other words, the energy Q(J) accumulated in the site to fail is determined by the heat calorific value H(W) caused by the reflected light flowing in the site to fail and the $\Delta T/R(W)$ flowing out of the site to fail, and the increase in temperature of the site to fail is determined. Thus, the boundary condition for failure occurrence caused by reflected light can be learned by a relatively simple method in which the upper limit temperature of the site to fail, the heat capacity of the site to fail, and the thermal resistance from the site to fail to the heat sink are determined by learning. Note that, when a site to fail is a site, the temperature of which increases by laser oscillation even if reflected light is absent, for example, the heat quantity flowing in a site to fail by laser oscillation without reflected light may be also learned in association with the result detected by the output light detection unit, thereby taking the influence into consideration.

FIG. 12A to FIG. 12C and FIG. 13A to FIG. 13C illustrate examples of a process of learning a failure occurrence boundary condition by a method of determining the upper limit temperature of the site to fail, the heat capacity of the site to fail, and the thermal resistance from the site to fail to the heat sink described above.

Figure 12A:
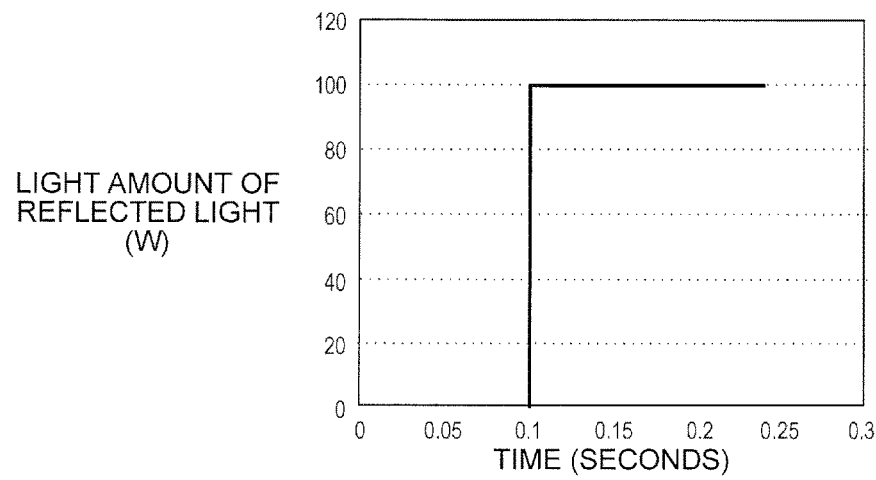
FIG. 12A to FIG. 12C are diagrams exemplifying a process of learning a failure occurrence boundary condition by a machine learning device according to a fifth embodiment of the present invention by a method of determining an upper limit temperature of a site to fail, a heat capacity of the site to fail, and a thermal resistance from the site to fail to a heat sink.
Figure 12B:
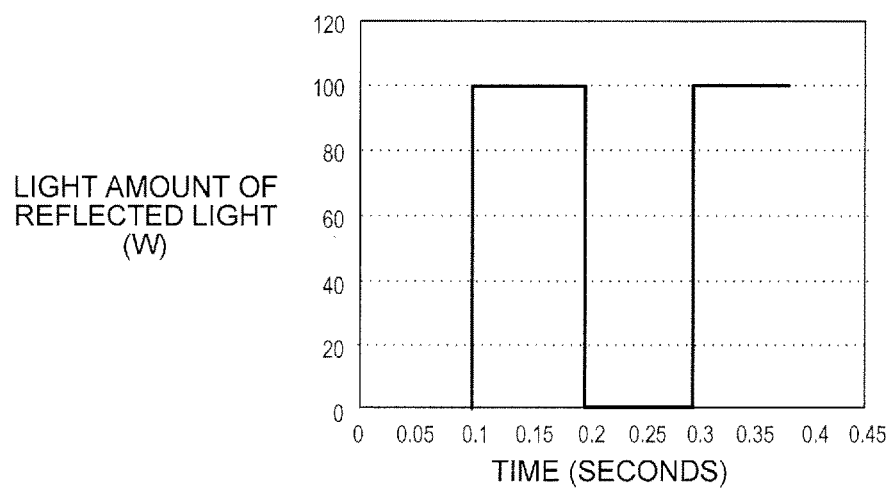
Figure 12C:
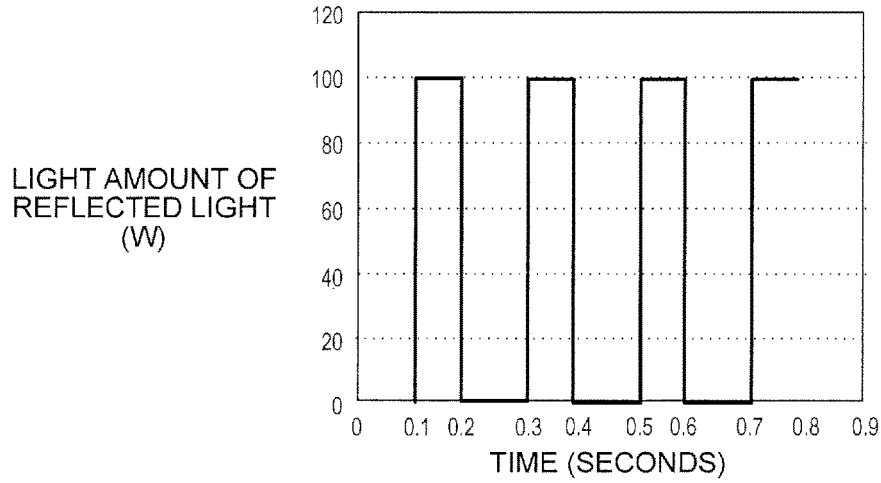

In the detection results of reflected light in FIG. 12A to FIG. 12C, the state variable of the fiber laser device and determination data indicating that a given site has failed when 0.24 seconds have elapsed in FIG. 12A, the site has failed when 0.385 seconds have elapsed in FIG. 12B, and the site has failed when 0.776 seconds have elapsed in FIG. 12C are used to associate the state quantity representing the driving state with the failure occurrence situation, thereby determining the upper limit temperature of the faulty site, the heat capacity of the faulty site, and the thermal resistance from the faulty site to the heat sink by learning.

Figure 13A:
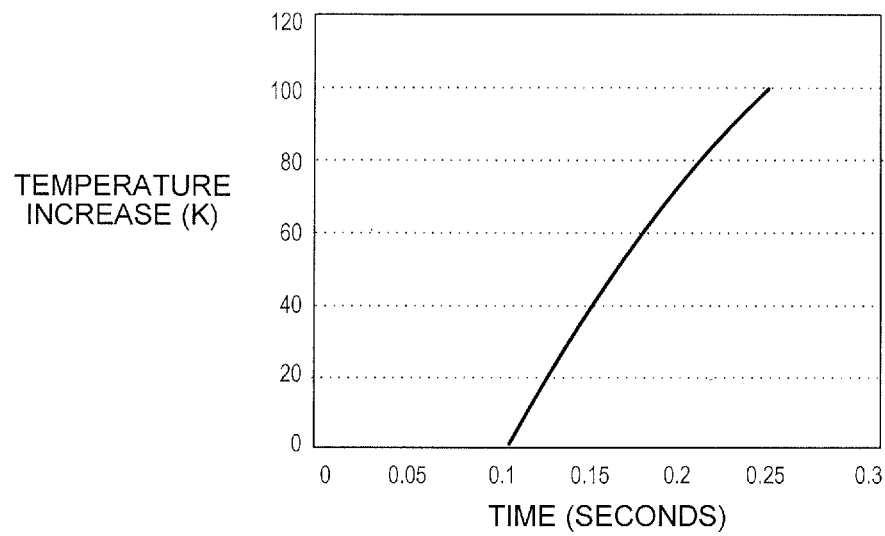
FIG. 13A to FIG. 13C are diagrams exemplifying a process of learning a failure occurrence boundary condition by the machine learning device according to the fifth embodiment of the present invention by a method of determining an upper limit temperature of a site to fail, a heat capacity of the site to fail, and a thermal resistance from the site to fail to a heat sink.
Figure 13B:
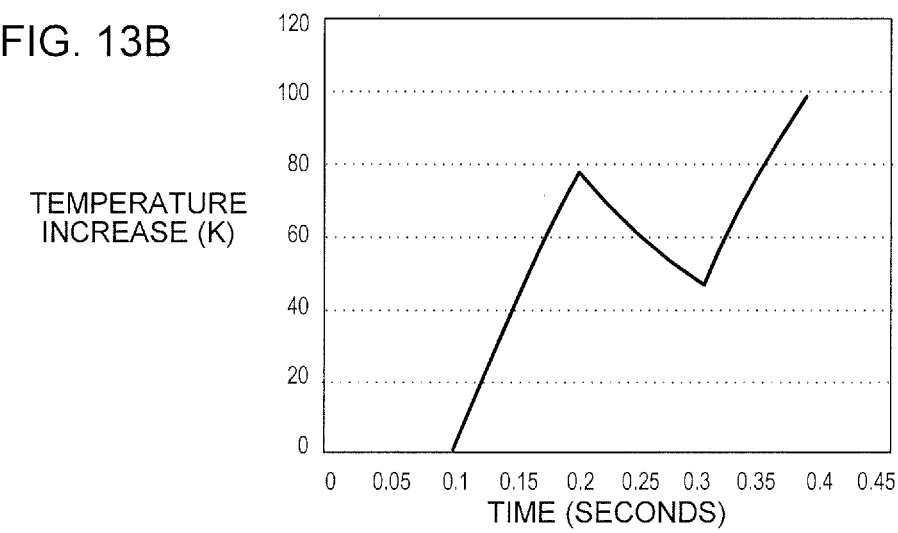
Figure 13C:
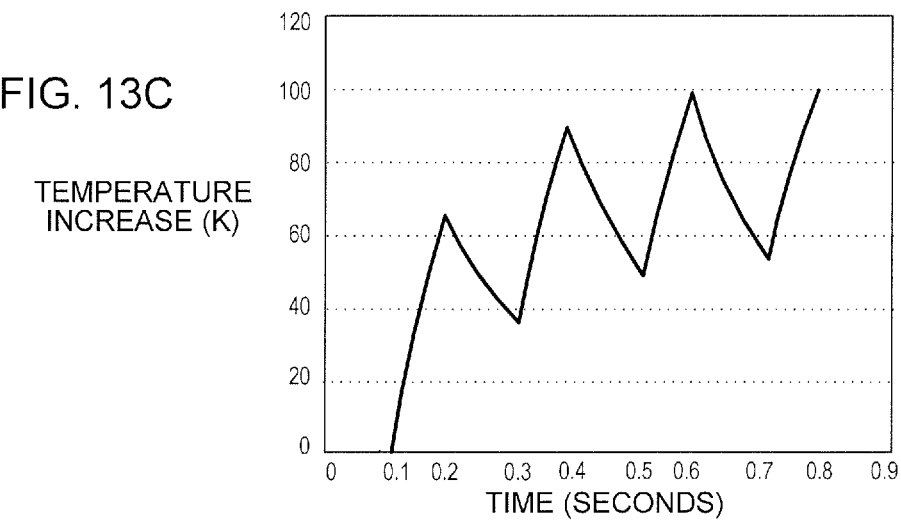

In the examples in FIG. 12A to FIG. 12C, if it is supposed that the amount of reflected light in FIG. 12A to FIG. 12C has a heat calorific value H(W) by reflected light flowing to a site to fail, the heat capacity of the site to fail is 0.1 (J/K), and the thermal resistance from the site to fail to a heat sink is 2 (K/W), the increases in temperature of the site to fail corresponding to the detection results of reflected light in FIG. 12A to FIG. 12C are as illustrated in FIG. 13A to FIG. 13C, respectively. Note that, in this case, the site to fail is a site, the temperature of which does not increase by laser oscillation without reflected light.

As illustrated in FIG. 13A to FIG. 13C, in any of the cases, a failure occurs due to reflected light when the temperature of the site to fail increases to be higher than the heat sink temperature by a temperature of 100 K. Thus, the supposition of the heat capacity of the site to fail and the thermal resistance from the site to fail to the heat sink is considered almost correct. In this manner, the failure occurrence boundary condition can be learned by learning a condition that the temperature at which a failure occurs due to reflected light almost matches. On the basis of the learning result, for example, a 80% level of the failure occurrence boundary condition, that is, in the example in this case, a condition that the temperature increase at the site to fail is 80 K, which is estimated from the detection result of the reflected light detection unit and the heat capacity of the site to fail and the thermal resistance from the site to fail to a heat sink obtained from the learning results is set as the failure avoidance critical condition. When the fiber laser device reaches the failure avoidance critical condition, the driving condition of the fiber laser device may be switched to the failure avoidance driving condition in order to avoid a failure.

As described above, by simplifying the learning contents, the learning can be progressed in a short period up to at least a certain degree of precision. After that, the precision can be improved by continuing the learning so as to reduce an error of the initial learning result.

Sixth Embodiment

Figure 14:
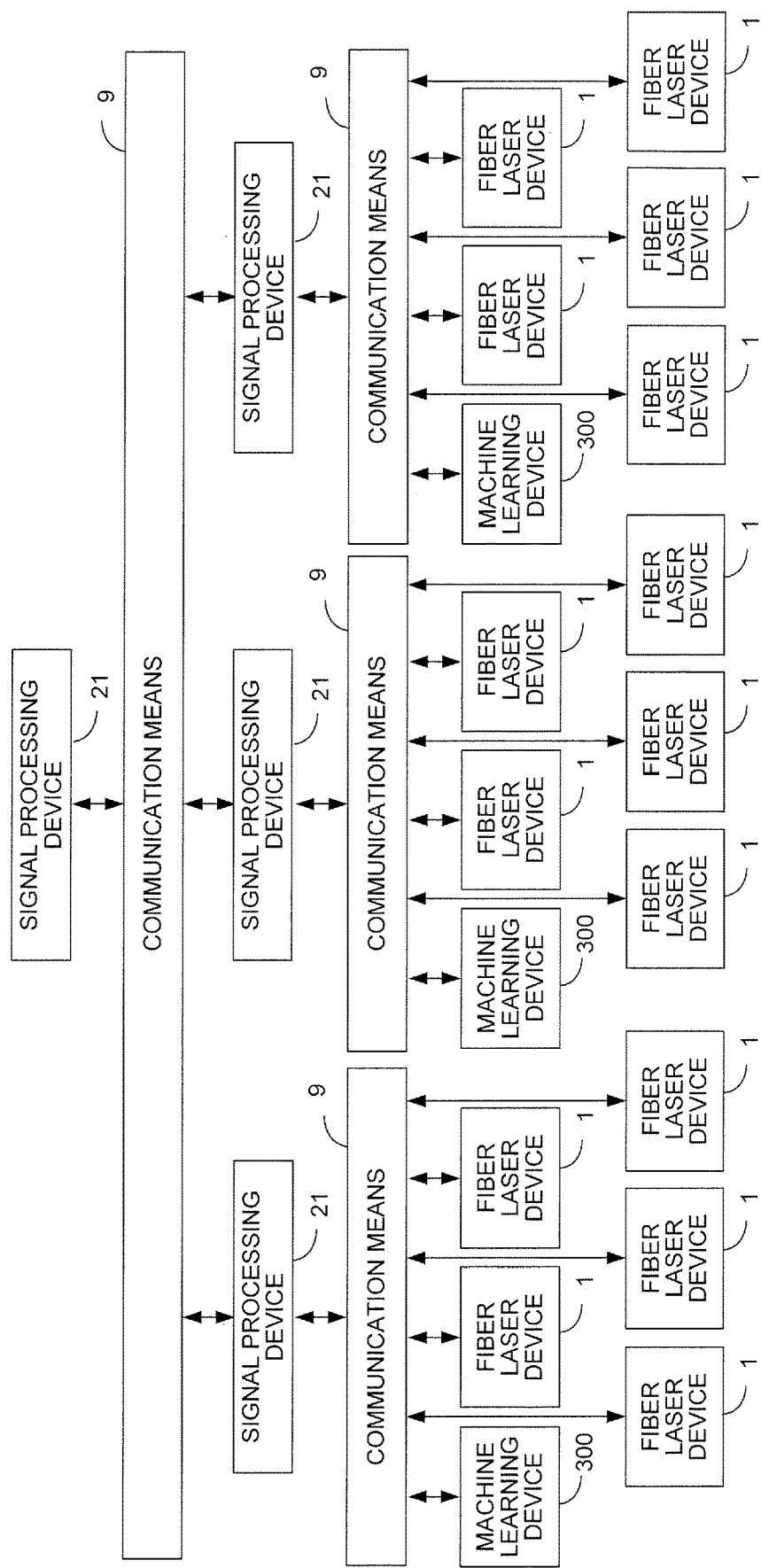
FIG. 14 is a diagram schematically illustrating how a machine learning device according to a sixth embodiment of the present invention is connected to communication means.

FIG. 14 is a diagram schematically illustrating how a machine learning device 300 according to a sixth embodiment of the present invention is connected to the communication means 9. Although the internal configuration of the machine learning device 300 is not illustrated, the machine learning device 300 has the same configuration as those of the machine learning devices 10, 100, and 200 described in the above-mentioned embodiments.

In this embodiment, as illustrated in FIG. 14, the machine learning device 300 is provided in plurality, and the respective machine learning devices 300 are connected to a signal processing device such as a host server through the communication means 9 and can share results learned by the machine learning devices 300. A signal processing device 21 such as a computer and a network switch may be interposed between the communication means 9 such as a host high-speed large-capacity network and the communication means 9 such as a network to which the machine learning device 300 is directly connected. The machine learning device 300 needs to observe and acquire the state quantity including the state variable representing the driving state of each fiber laser device 1 and determination data in real time, and when manufacturing condition data and individual difference information on the fiber laser devices 1 are recorded, the recording amount per fiber laser device 1 is significantly large. Thus, in this embodiment, several to several tens of fiber laser devices 1 are considered appropriate as the number of fiber laser devices 1 that are directly connected to one machine learning device 300 through the communication means 9 for exchanging data and information described above.

On the other hand, in a fiber laser device 1 actually used for laser machining, the probability of occurrence of a failure by reflected light is low, and the number of fiber laser devices 1 that can be used as limitation characteristic test fiber laser devices is limited. Thus, in this embodiment, the results learned by a large number of machine learning devices 300 can be shared to progress the learning by using failure information on many fiber laser devices 1 while maintaining real-time performance of the observation and acquisition of the state quantity and determination data and suppressing the expansion of the volume of information to be recorded. Consequently, the accuracy of the learning results improves.

Seventh Embodiment

Figure 15:
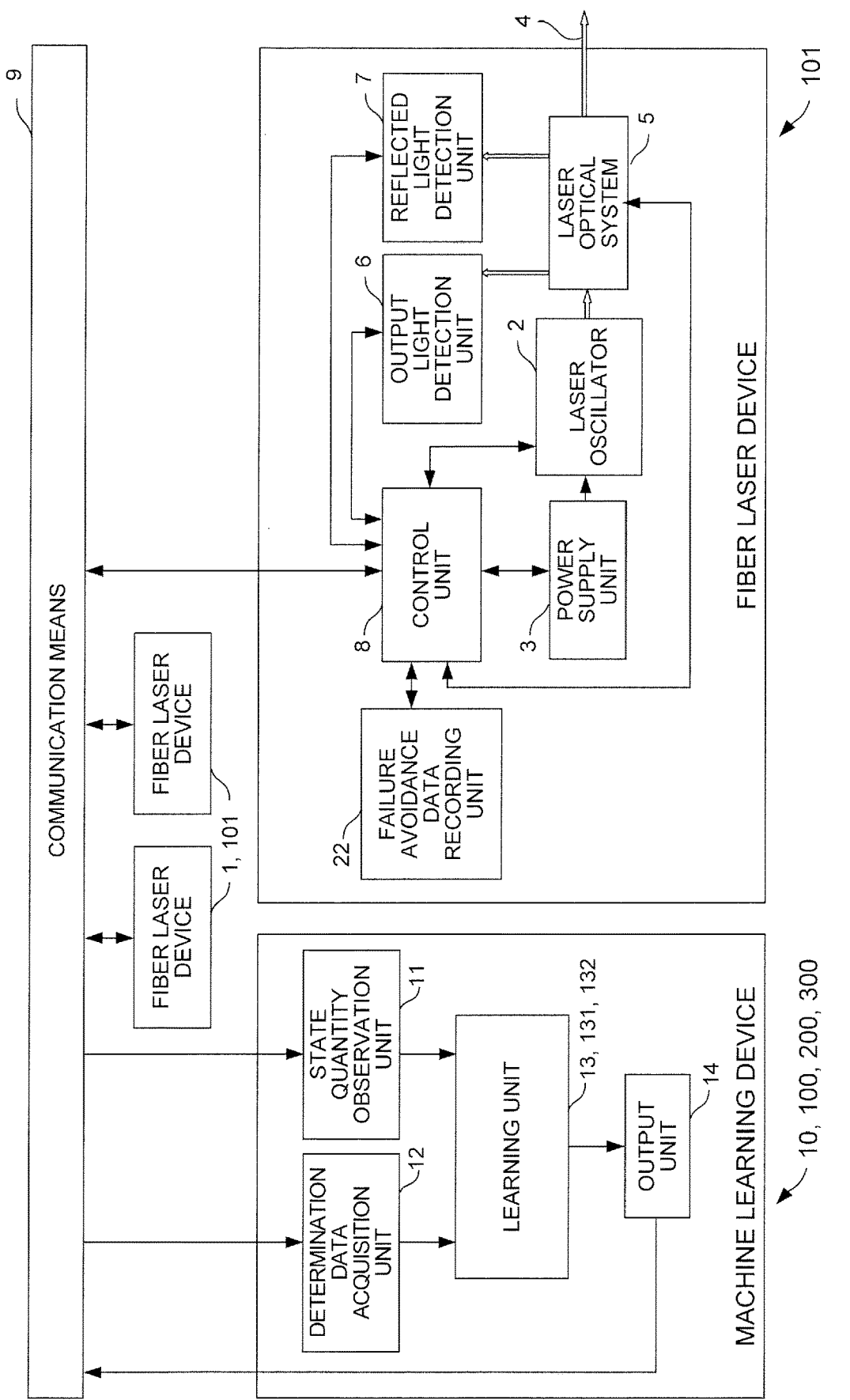
FIG. 15 is a block diagram illustrating a conceptual configuration of a fiber laser device according to a seventh embodiment of the present invention.

FIG. 15 is a block diagram illustrating a conceptual configuration of a fiber laser device 101 according to a seventh embodiment of the present invention. The fiber laser device 101 is connected to any of the machine learning devices 10, 100, 200, and 300 described above through communication means 9.

In this embodiment, a control unit 8 in the fiber laser device 101 refers to failure avoidance data from the output unit 14 in the machine learning device 10, 100, 200, or 300 to control each unit constituting the fiber laser device 101 on the basis of learning results of the learning unit 13, 131, or 132 in the machine learning device 10, 100, 200, or 300 in order to avoid a failure caused by reflected light. The fiber laser device 101 in this embodiment includes a failure avoidance data recording unit 22 for recording failure avoidance data, and records the failure avoidance data in the failure avoidance data recording unit 22. The fiber laser device 101 refers to the failure avoidance data recorded in the failure avoidance data recording unit 22, and the control unit 8 controls each unit constituting the fiber laser device 1 in order to avoid a failure caused by reflected light.

According to this embodiment, on the basis of the boundary condition for failure occurrence caused by reflected light, which is the learning result by the learning unit 13, 131, or 132 in the machine learning device 10, 100, 200, or 300, the failure avoidance data such as the failure avoidance critical condition and the failure avoidance driving condition output to each fiber laser device 1 can be referred to, to control the driving conditions such as the light output condition so as to avoid a failure. Consequently, the fiber laser device 1 capable of preventing the occurrence of machining defects by stopping laser oscillation and reducing light output more than necessary while preventing a failure by reflected light.

The fiber laser device 101 in this embodiment includes the failure avoidance data recording unit 22 for recording the failure avoidance data, and the failure avoidance data is recorded in the failure avoidance data recording unit 22. The control unit 8 refers to the failure avoidance data recorded in the failure avoidance data recording unit 22 to control each unit constituting the fiber laser device 1 in order to avoid a failure by reflected light. As a result, in this embodiment, as compared with the case where the failure avoidance data such as the failure avoidance critical condition and the failure avoidance driving condition recorded in the machine learning device 10, 100, 200, or 300 is read from the machine learning device 10, 100, 200, or 300 every time to avoid a failure by reflected light, the response for failure avoidance can be increased to more reliably prevent the occurrence of a failure by reflected light due to response delay.

Eighth Embodiment

Figure 16:
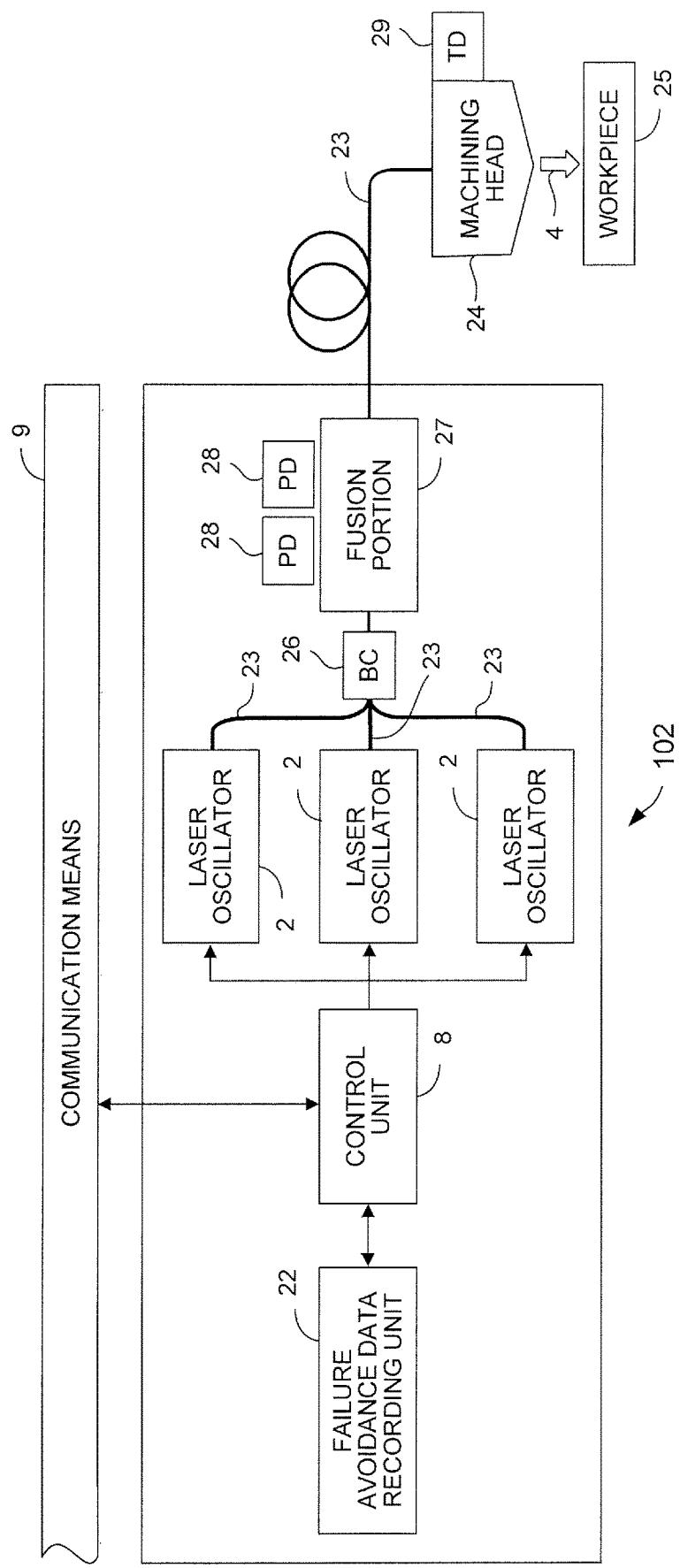
FIG. 16 is a block diagram illustrating a conceptual configuration of a fiber laser device according to an eighth embodiment of the present invention.

FIG. 16 is a block diagram illustrating a conceptual configuration of a fiber laser device 102 according to an eighth embodiment of the present invention.

The fiber laser device 102 in this embodiment is connected to a machine learning device through communication means 9, and includes three laser oscillators 2. Optical fibers 23 through which laser light beams emitted from the laser oscillators 2 propagate are converted into one optical fiber 23 by a beam combiner 26. Laser light beams coupled by the beam combiner 26 propagate to a machining head 24 through a fusion portion (a splice) 27 where optical fibers having different core diameters are fused (spliced), and laser light is emitted from the machining head 24 toward a workpiece 25. Note that the illustration of the power supply unit 3 and signal lines between the control unit 8 and a photodiode 28 or temperature detection unit 29 is omitted.

The following case is conceivable. A part of laser light emitted to the workpiece 25 is reflected by the surface of the workpiece 25, and a part of the reflected light returns toward the machining head 24 and propagates through the optical fiber 23 in a direction opposite to the output light from the laser oscillator 2 to damage the laser optical system 5 constituted by optical fibers or the laser oscillator 2, so that a failure occurs in the fiber laser device 102.

Thus, in this embodiment, the photodiodes 28 for detecting light that leaks from the optical fibers from which protective coating has been removed are disposed on both sides of the fusion portion 27 of the optical fibers having different core diameters. In FIG. 16, when the core diameter of the optical fiber 23 on the right side of the fusion portion 27 of the optical fibers having different core diameters is larger, the right photodiode 28 can mainly detect reflected light that has propagated through a clad of the optical fiber 23, and the left photodiode 28 can mainly detect reflected light that has propagated through a core of the optical fiber 23. The reason why the left photodiode 28 can mainly detect reflected light that has propagated through the core of the optical fiber 23 is that reflected light that has propagated through the core of the optical fiber 23 from the right side to the left side exits from the core to the clad because the core diameter is thin at the fusion portion 27 of the optical fibers having different core diameters. Note that the photodiodes 28 detect leaked output light as well, but the light amount or energy of the reflected light can be known by determining a value detected for a light output instruction in the state in which the reflected light is small in advance and subtracting a detection value by the output light from the determined detection value.

By using the photodiodes 28 as the reflected light detection unit 7 as described above, the intensity of reflected light, which may instantaneously change, can be detected without time delay to reliably avoid a failure by reflected light because the photodiodes 28 have high response speed. Reflected light propagating through the core of the optical fiber 23 reaches a deep part of the fiber laser device 102 while reflected light propagating through the clad of the optical fiber 23 may cause burnout of coating of the optical fiber 23, and hence the reflected light propagating through the core and the reflected light propagating through the clad have different influences on the fiber laser device 102 and the degrees of the influences are different. Thus, the reflected light detection unit 7 (photodiode 28) for detecting the reflected light propagating through the core of the optical fiber 23 and the reflected light detection unit 7 (photodiode 28) for detecting the reflected light propagating through the clad of the optical fiber are provided to detect the reflected light propagating through the core and the reflected light propagating through the clad in a distinguished manner. In this manner, the boundary condition for failure occurrence caused by reflected light can be accurately learned. Note that the photodiodes 28 can be used as output light detection unit 6 in the state in which the reflected light is small. In particular, laser light propagating through an optical fiber having a small core diameter is close to a single mode and the mode is stable, and hence the left photodiode 28 installed on the optical fiber having a smaller core diameter is effective as an output light detection unit 6 (power monitor for output light).

Note that the reflected light is not limited to only reflected light from the workpiece 25. For example, if a transmissive window of the machining head 24 is contaminated by fume generated during laser machining and the transmittance decreases, light reflected by the transmissive window of the machining head 24 returns. In this case, the reflected light does not always return to the optical fiber 23, and may cause the temperature increase in the machining head 24. As described above, when the reflected light is applied to a site having a large heat capacity, an increase in light amount of the reflected light appears as a temperature increase in the site, and hence by providing the temperature detection unit 29 at the site as a reflected light detection unit, the damage of the site can be avoided. In this embodiment, the temperature detection unit 29 is installed on the machining head 24 as the reflected light detection unit.

FIG. 17 is a block diagram illustrating a conceptual configuration of the laser oscillator 2 constituting the fiber laser device in this embodiment.

Laser light beams emitted from a plurality of laser diode modules 30 to optical fibers 23 are coupled by the beam combiner 26 and propagate through an active dopant-added optical fiber to act as an excitation light source, and a resonator 31 is formed between a high-reflecting fiber Bragg grating 32 and a partially-reflecting fiber Bragg grating 33 for laser oscillation. Note that the illustration of cables for supplying a drive current from the power supply unit 3 to each laser diode module 30 and signal lines connecting the photodiode 28 and the control unit 8 is omitted.

In this embodiment, a photodiode 28 is installed on the side surface of an optical fiber 23 on the side where laser light is output from the laser oscillator 2, and a photodiode 28 is also installed at one port branched from the beam combiner 26 on the high-reflective fiber Bragg grating 32 side. The former photodiode 28 detects laser light leaking from a part of the optical fiber 23 where protective coating is removed, and the latter photodiode 28 detects laser light released from the optical fiber end. The former photodiode 28 can be also used as reflected light detection unit 7, and can be also used as output light detection unit 6 when reflected light is small. The latter photodiode 28 may be used as a means for detecting light, the wavelength of which is shifted from output laser light that has passed through the high-reflective fiber Bragg grating 32, for example, Stokes light caused by stimulated Raman scattering. In this manner, the output light detection unit 6 and the reflected light detection unit 7 may be provided inside the laser oscillator 2.

As described above, in this embodiment, by increasing the number of the reflected light detection unit 7 including the temperature detection unit, a failure site can be estimated from detection results of the detection means, and hence the risk that a failure occurs by reflected light due to insufficient detection of the reflected light can be reduced. Note that the installation positions and the installation numbers of the reflected light detection unit 7 and the output light detection unit 6 and the number of the laser oscillators 2 in this embodiment are examples, and are not limited to the examples in this embodiment.

While the embodiments of the present invention have been described, the present invention is not limited to only examples of the above-mentioned embodiments, and can be carried out in various modes by adding appropriate changes.

The invention claimed is:

1. A machine learning device, which is connected to a control unit in at least one fiber laser device through communication means,
the fiber laser device including: at least one laser oscillator; a power supply unit for supplying a driving current to the laser oscillator; a laser optical system including a machining head for applying laser light emitted from the laser oscillator to a workpiece, which is an object to be machined by laser, through an optical fiber; at least one output light detection unit for detecting a light output of the laser light emitted from the laser oscillator; at least one reflected light detection unit for detecting reflected light that has been reflected by the workpiece or a component included in the laser optical system and has returned to the laser oscillator or the laser optical system; and a control unit for at least outputting a current output instruction corresponding to a light output instruction to the power supply unit and receiving detection signals from the output light detection unit and the reflected light detection unit,
the machine learning device comprising:
a state quantity observation unit for observing, as a state variable representing a driving state of the fiber laser device, a state quantity of the fiber laser device including at least time-series data on output light detection results detected by the output light detection unit and reflected light detection results detected by the reflected light detection unit;
a determination data acquisition unit for acquiring determination data representing a failure occurrence situation in the fiber laser device as determined from a difference between at least light output results detected by the output light detection unit and the light output instruction;
a learning unit for learning a boundary condition for failure occurrence caused by the reflected light in the fiber laser device by using the state variable and the determination data and associating the state quantity of the fiber laser device with the failure occurrence situation; and
an output unit for outputting, on the basis of a learning result by the learning unit, at least one of failure occurrence boundary condition data and failure avoidance data including information for avoiding a failure caused by reflected light.

2. The machine learning device according to claim 1, wherein at least one of the fiber laser devices connected to the machine learning device through the communication means via the control unit is a limitation characteristic test fiber laser device, which is the fiber laser device for a limitation characteristic test.

3. The machine learning device according to claim 2, wherein the machine learning device is configured to: predict, on the basis of a learning result by the learning unit, for the at least one limitation characteristic test fiber laser device, the boundary condition for failure occurrence caused by reflected light in the limitation characteristic test fiber laser device; and output a limitation characteristic test condition program with which effective test data is estimated to be obtained by a limitation characteristic test, from the output unit as the failure avoidance data.

4. The machine learning device according to claim 3, wherein, when a failure by reflected light occurs while the limitation characteristic test is executed in accordance with the limitation characteristic test condition program, the learning unit extracts the state quantity of the fiber laser device including the reflected light detection result detected by the reflected light detection unit or a change in the state quantity for a test conducted under test conditions before a failure by reflected light occurs, constructs a learning model for exploring for features of the extracted state quantity or the extracted change in the state quantity, and learns a precursor of failure caused by reflected light while the limitation characteristic test is executed in accordance with the limitation characteristic test condition program.

5. The machine learning device according to claim 4, wherein, on the basis of a learning result related to the precursor, when a precursor of failure caused by reflected light is observed in the state quantity of the fiber laser device including the reflected light detection result detected by the reflected light detection unit or the change in the state quantity while the limitation characteristic test is executed in accordance with the limitation characteristic test condition program, the machine learning device outputs the failure avoidance data for instructing suspension of the test according to the limitation characteristic test condition program or change of the limitation characteristic test condition program, to the control unit in the fiber laser device.

6. The machine learning device according to claim 1, wherein at least one of a structure, a configuration, a model, a drawing number, specifications, a date of manufacture, a production lot, a location of manufacture, and a product number of the fiber laser device is included in the state quantity of the fiber laser device observed by the state quantity observation unit, as manufacturing condition data on the fiber laser device.

7. The machine learning device according to claim 6, wherein the learning unit uses the state variable including the manufacturing condition data and the determination data and associates the state quantity of the fiber laser device including the manufacturing condition data with the failure occurrence situation to learn manufacturing condition dependency of the boundary condition for failure occurrence caused by reflected light in addition to the boundary condition for failure occurrence caused by reflected light in the fiber laser device.

8. The machine learning device according to claim 1, wherein:
   the machine learning device further includes a history recording unit;
   the machine learning device records, for each fiber laser device connected through the communication means via the control unit, history data on a state quantity of the fiber laser device observed by the state quantity observation unit in the history recording unit, as a state quantity history;
   the learning unit uses the state variable of the fiber laser device including the state quantity history of the fiber laser device recorded in the history recording unit and the determination data and associates the state quantity of the fiber laser device including the state quantity history with the failure occurrence situation to learn state quantity history dependency of the boundary condition for failure occurrence caused by reflected light in addition to the boundary condition for failure occurrence caused by reflected light in the fiber laser device.

9. The machine learning device according to claim 8, wherein the machine learning device is configured to:
   select, on the basis of at least a learning result of the state quantity history dependency of the boundary condition for failure occurrence caused by reflected light in the fiber laser device, at least one state quantity, the history of which has a predetermined level or more of influence on the boundary condition for failure occurrence caused by reflected light; and
   avoid recording histories of one or more state quantities except for a history of the selected state quantity in the history recording unit.

10. The machine learning device according to claim 8, wherein:
   the machine learning device instructs the control unit in the fiber laser device to drive the fiber laser device under predetermined driving conditions, which are driving conditions determined in advance, in accordance with a predetermined schedule; and
   the machine learning device records at least the state quantity of the fiber laser device obtained each time the fiber laser device is driven under the predetermined driving conditions, in the history recording unit as the state quantity history of the fiber laser device.

11. The machine learning device according to claim 8, wherein:
   the machine learning device instructs a control unit in a fiber laser device newly connected to the communication means to which the machine learning device is connected, to drive the fiber laser device under predetermined initial driving conditions, which are initial driving conditions determined in advance; and
   the machine learning device records at least the state quantity of the fiber laser device obtained when the fiber laser device is driven under the predetermined initial driving conditions, in the history recording unit as the state quantity history of the fiber laser device.

12. The machine learning device according to claim 1, wherein the machine learning device outputs, from the output unit and on the basis of a learning result including at least a learning result of the boundary condition for failure occurrence caused by reflected light, a failure avoidance critical condition for the state quantity of the fiber laser device including the reflected light detection result detected by the reflected light detection unit, under which a driving condition of the fiber laser device needs to be changed in order to avoid a failure by reflected light, or the failure avoidance critical condition and a failure avoidance driving condition that is the driving condition of the fiber laser device for avoiding a failure by reflected light when the failure avoidance critical condition is reached, to the control unit in each of the fiber laser devices connected through the communication means as the failure avoidance data.

13. The machine learning device according to claim 12, wherein the failure avoidance driving condition of the fiber laser device for avoiding a failure by reflected light when the failure avoidance critical condition is reached includes at least one of a laser light output condition corresponding to the light output instruction, a relative position condition between the machining head and the workpiece, a relative position condition between a focal point of laser light emitted from the machining head and the workpiece, an F-number condition of a condensing optical system of the machining head, and a beam profile condition of a laser beam emitted from the machining head.

14. The machine learning device according to claim 1, wherein the machine learning device learns the failure occurrence boundary condition by a simplified method in which, at least in an initial stage of learning, for at least one site to fail, at least an upper limit temperature of the site, a heat capacity of the site, and a thermal resistance from the site to a heat sink are determined.

15. The machine learning device according to claim 1, wherein the machine learning device is provided in plurality, and the respective machine learning devices are connected to a host signal processing device through communication means and are capable of sharing results learned by the machine learning devices.

16. A fiber laser device, which is connected to the machine learning device according to claim 1 through the communication means,
   wherein the control unit in the fiber laser device refers to the failure avoidance data output from the output unit on the basis of a learning result of the learning unit in the machine learning device to control at least one unit constituting the fiber laser device in order to avoid a failure caused by reflected light,
   and wherein at least one of the reflected light detection units includes a photodiode.

17. The fiber laser device according to claim 16, further comprising a failure avoidance data recording unit for recording the failure avoidance data output from the output unit in the machine learning device,
   wherein the failure avoidance data is recorded in the failure avoidance data recording unit, and the control unit in the fiber laser device refers to the failure avoidance data recorded in the failure avoidance data recording unit to control at least one unit constituting the fiber laser device in order to avoid a failure caused by reflected light.

\* \* \* \* \*